US012681250B2

(12) United States Patent
Tsai et al.

(10) Patent No.: US 12,681,250 B2
(45) Date of Patent: Jul. 14, 2026

(54) INTERPOSER WITH PLANAR SIDEWALL SURFACE FOR OPTICAL COUPLING AND METHODS OF FORMING THE SAME

(71) Applicant: Taiwan Semiconductor Manufacturing Company Limited, Hsinchu (TW)

(72) Inventors: Tsung-Fu Tsai, Changhua City (TW); Chao-Jen Wang, Hsinchu City (TW); Szu-Wei Lu, Hsinchu City (TW); Chung-Shi Liu, Hsinchu City (TW); Chen-Hua Yu, Hsinchu City (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 307 days.

(21) Appl. No.: 18/460,769

(22) Filed: Sep. 5, 2023

(65) Prior Publication Data
US 2025/0076599 A1 Mar. 6, 2025

(51) Int. Cl.
G02B 6/42 (2006.01)

(52) U.S. Cl.
CPC ......... G02B 6/4283 (2013.01); G02B 6/4291 (2013.01); G02B 6/4293 (2013.01)

(58) Field of Classification Search
None
See application file for complete search history.

(56) References Cited

U.S. PATENT DOCUMENTS

2022/0342150 A1* 10/2022 Karhade ............ G02B 6/12002
2023/0228953 A1* 7/2023 Venkatesan ............ G02B 6/423
385/52

FOREIGN PATENT DOCUMENTS

KR 20040095631 A * 11/2004 ............ H01L 23/13
KR 20060080236 A * 7/2006 ....... H01L 23/49827
TW 202133353 A 9/2021
TW 202212879 A 4/2022

OTHER PUBLICATIONS

TW Patent and Trademark Office; TW Application No. 112140962; Office Action mailed Jan. 10, 2025; 14 pages.

* cited by examiner

*Primary Examiner* — Chris H Chu
(74) *Attorney, Agent, or Firm* — The Marbury Law Group, PLLC

(57) ABSTRACT
A device structure includes: an interposer including metal wiring structures and optical waveguides that are embedded in interlayer dielectric layers, wherein the interposer includes a stepped outer sidewall including an outermost vertical surface segment, a laterally-recessed sidewall segment that is laterally recessed relative to the outermost vertical surface segment, and a connecting horizontal surface segment that connects the outermost vertical surface segment and the laterally-recessed vertical sidewall segment; and a fiber access unit having a first end that is optically coupled to a subset of the optical waveguides through at least one optical glue portion that is interposed between the fiber access unit and the laterally-recessed sidewall segment of the stepped outer sidewall.

20 Claims, 16 Drawing Sheets

1610 providing an interposer that comprises redistribution interconnect structures and optical waveguides that are embedded in redistribution dielectric layers and further comprises a stepped outer sidewall including a laterally-recessed sidewall segment including a vertically-extending surface of the redistribution dielectric layers and laterally recessed relative to a first outermost vertical surface segment

1620 optically coupling a first end of a fiber access unit to a subset of the optical waveguides through at least one optical glue portion, wherein the at least one optical glue portion is interposed between the fiber access unit and the laterally-recessed sidewall segment of the stepped outer sidewall

FIG. 16

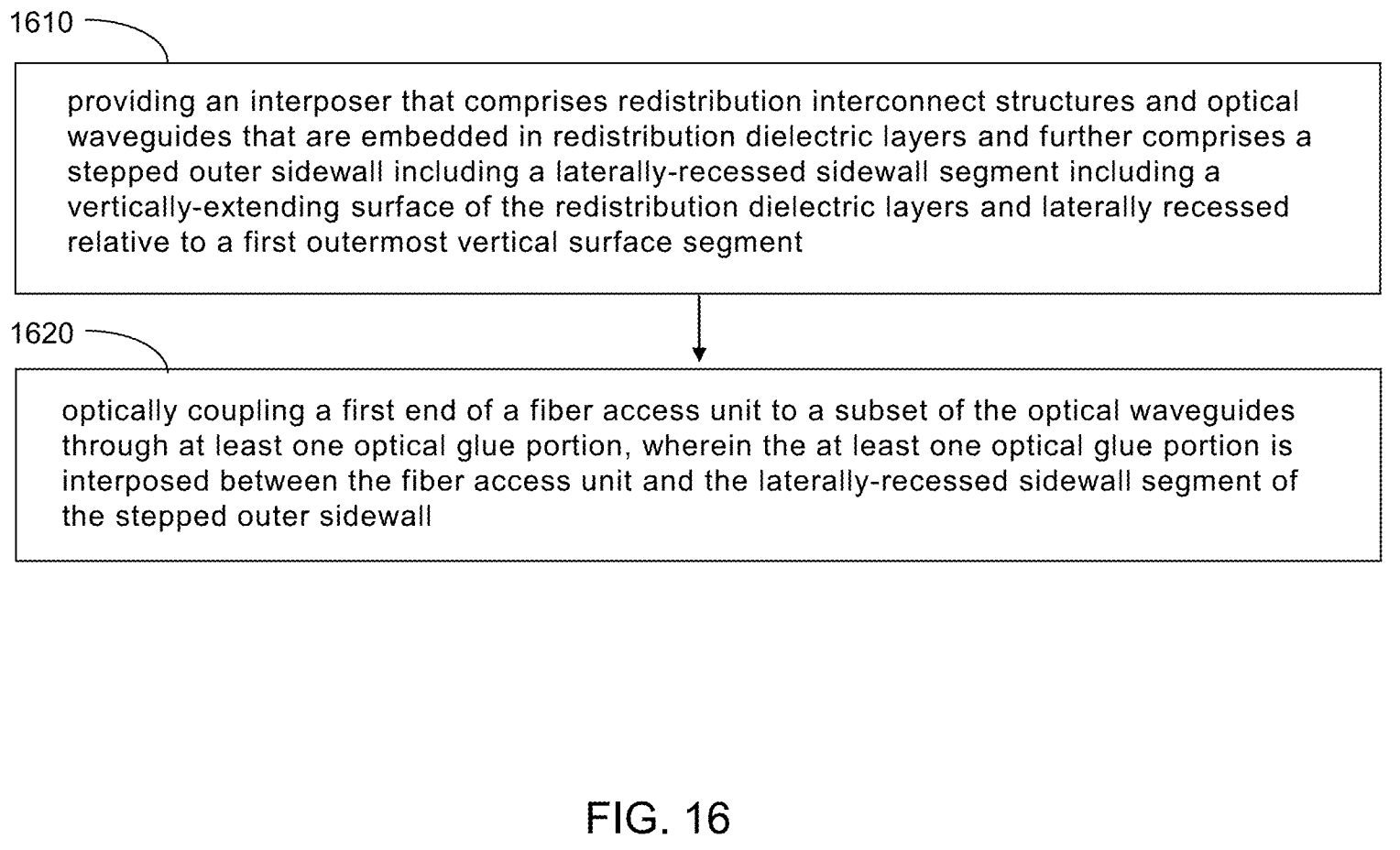

INTERPOSER WITH PLANAR SIDEWALL SURFACE FOR OPTICAL COUPLING AND METHODS OF FORMING THE SAME

BACKGROUND

Optical devices may be integrated with silicon packages in silicon photonics technology. Performance of integrated optical devices may be enhanced by providing low optical loss and high optical bandwidth.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 16 is a flowchart illustrating steps for forming a device structure according to an embodiment of the present disclosure.

DETAILED DESCRIPTION

Figure 1:
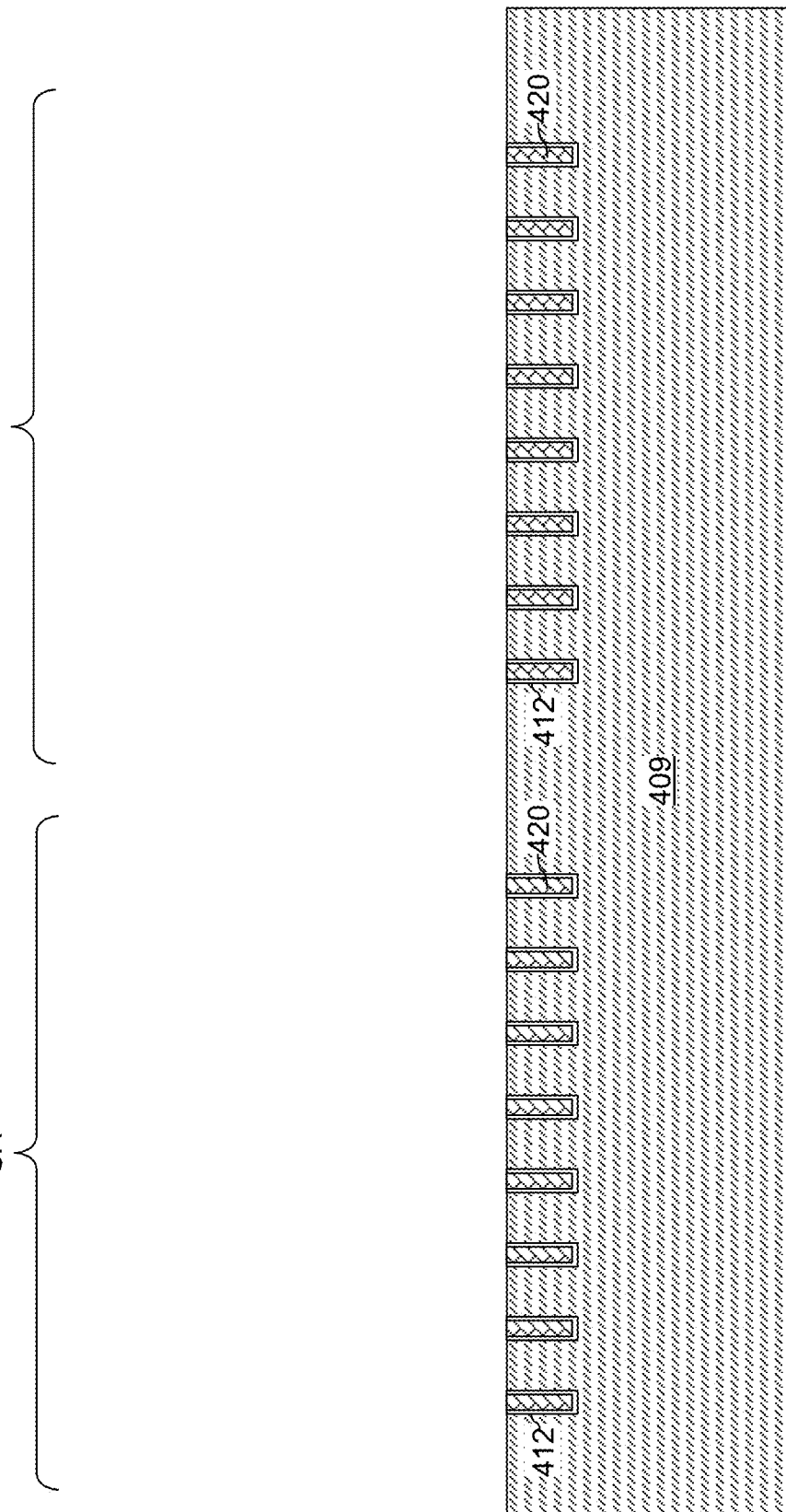
FIG. 1 is a vertical cross-sectional view of an intermediate structure including a silicon substrate and through-substrate via structures therein according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

Various embodiments disclosed herein are directed to a device structure including optical waveguides in an interposer and a fiber access unit having a first end that is optically coupled to the optical waveguides through at least one optical glue portion. A sidewall of the interposer in proximity to end portions of the optical waveguides may be formed as a smooth surface by performing an anisotropic etch process. An optical glue or a sacrificial material may be applied to the surface formed by the anisotropic etch process during singulation of the interposer from a reconstituted wafer including an array of interposers. A remaining portion of the optical glue may be used as a portion of an optical path between the fiber access unit and the optical waveguides, or may be replaced with another optical glue portion.

Referring to FIG. 1, a region of an intermediate structure according to an embodiment of the present disclosure is illustrated, which includes a silicon substrate 409 and through-substrate via structures 420 formed therein. The silicon substrate 409 may comprise a commercially available silicon wafer. Arrays of substrate via cavities may be formed in an upper portion of the silicon substrate 409 (e.g., through an photolithographic etch process), and may be filled with a dielectric liner layer and at least one conductive fill material (such as at least one metallic material). Remaining portions of the dielectric liner layer comprise dielectric spacers 412. Remaining portions of the at least one conductive fill material comprise through-silicon via structures 420. In one embodiment, a two-dimensional periodic array of unit areas UA may be provided in the silicon substrate 409. Each unit area UA may include an array of through-silicon via structures 420. The height of the through-silicon via structures 420 may be in a range from 2 microns to 30 microns, such as from 6 microns to 15 microns, although lesser and greater heights may also be used.

Figure 2:
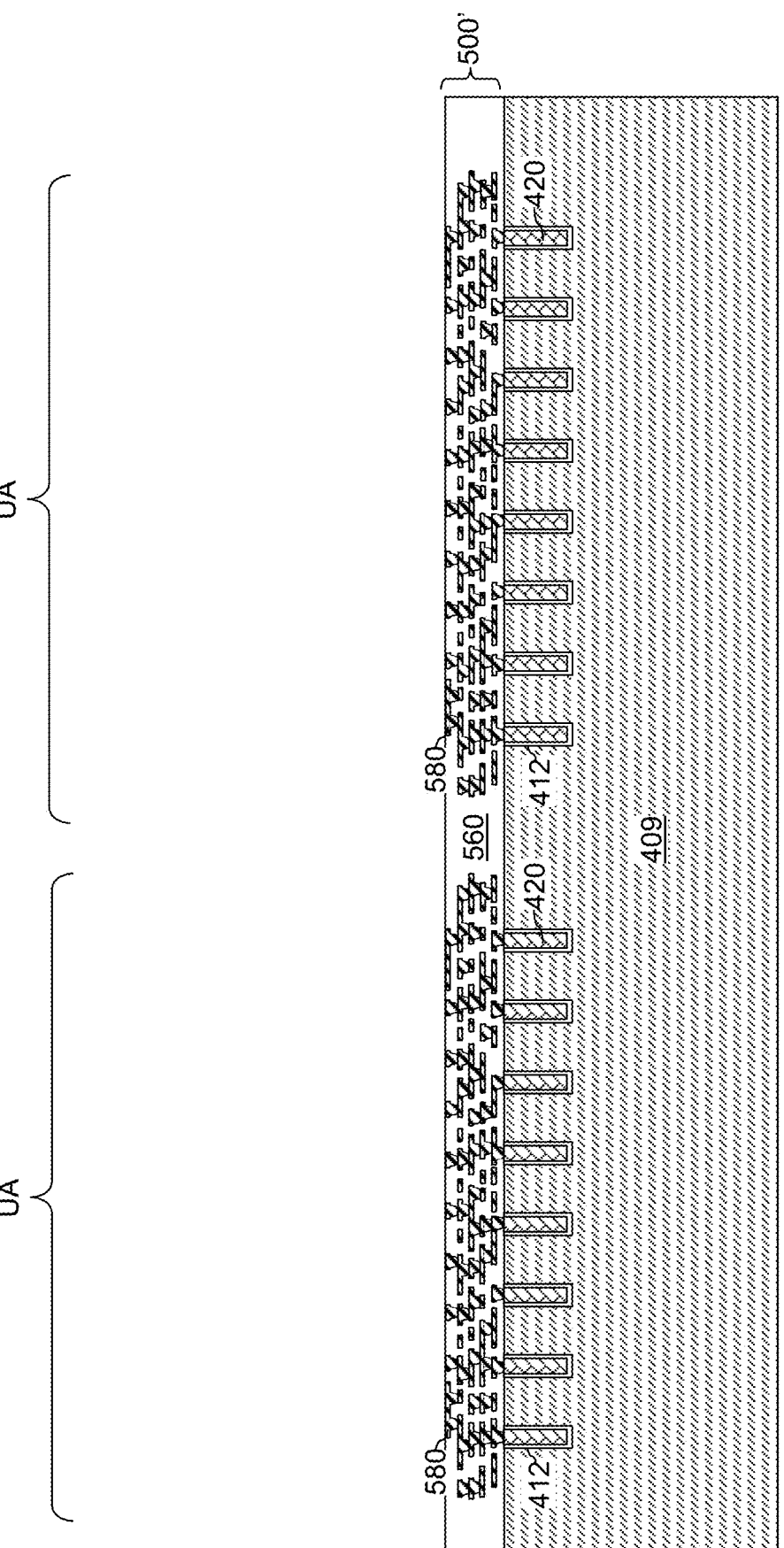
FIG. 2 is a vertical cross-sectional view of the intermediate structure after formation of interlayer dielectric layers and metal wiring structures according to an embodiment of the present disclosure.

Referring to FIG. 2, an in-process interconnect structure 500' may be formed within each unit area UA. A two-dimensional periodic array of in-process interconnect structures 500' may be formed over the silicon substrate 409. Each in-process interconnect structure 500' may include interlayer dielectric (ILD) layers 560 and metal wiring structures 580. The interlayer dielectric layers 560 include a respective dielectric material, such as silicon oxide, silicon nitride, silico oxynitride, silicon carbide nitride, organosilicate glass, and/or dielectric metal oxides. The interlayer dielectric layers 560 may comprise, may be composed predominantly of, and/or may consist essentially of, inorganic dielectric materials. Each interlayer dielectric layer 560 may be formed by chemical vapor deposition, physical vapor deposition, atomic layer deposition, spin coating, etc. The thickness of each interlayer dielectric layer 560 may be in a range from 100 nm to 1,000 nm, such as from 200 nm to 600 nm, although lesser and greater thicknesses may also be used. Each interlayer dielectric layer 560 may be patterned, for example, by applying and patterning a respective photoresist layer thereabove, and by transferring the pattern in the photoresist layer into the interlayer dielectric layer 560 using an etch process such as an anisotropic etch process. The photoresist layer may be subsequently removed, for example, by ashing.

The metal wiring structures 580 may be formed by depositing a metal layer and by patterning the metal layer by a combination of lithography and etching. Alternatively or additionally, the metal wiring structures 580 may be formed by using a damascene process in which recesses (such as line cavities, via cavities, and/or integrated line-and-via cavities) are formed in the interlayer dielectric layer 560, and are subsequently filled with at least one metallic material that is subsequently planarized, for example, by chemical mechanical polishing process. The total number of levels of wiring in each in-process interconnect structure 500' (i.e., the levels of the metal wiring structures 580) may be in a range from 1 to 10. In some embodiments, the in-process interconnect structures 500' may be formed in a back-end-of-the-line (BEOL) process.

Figure 3:
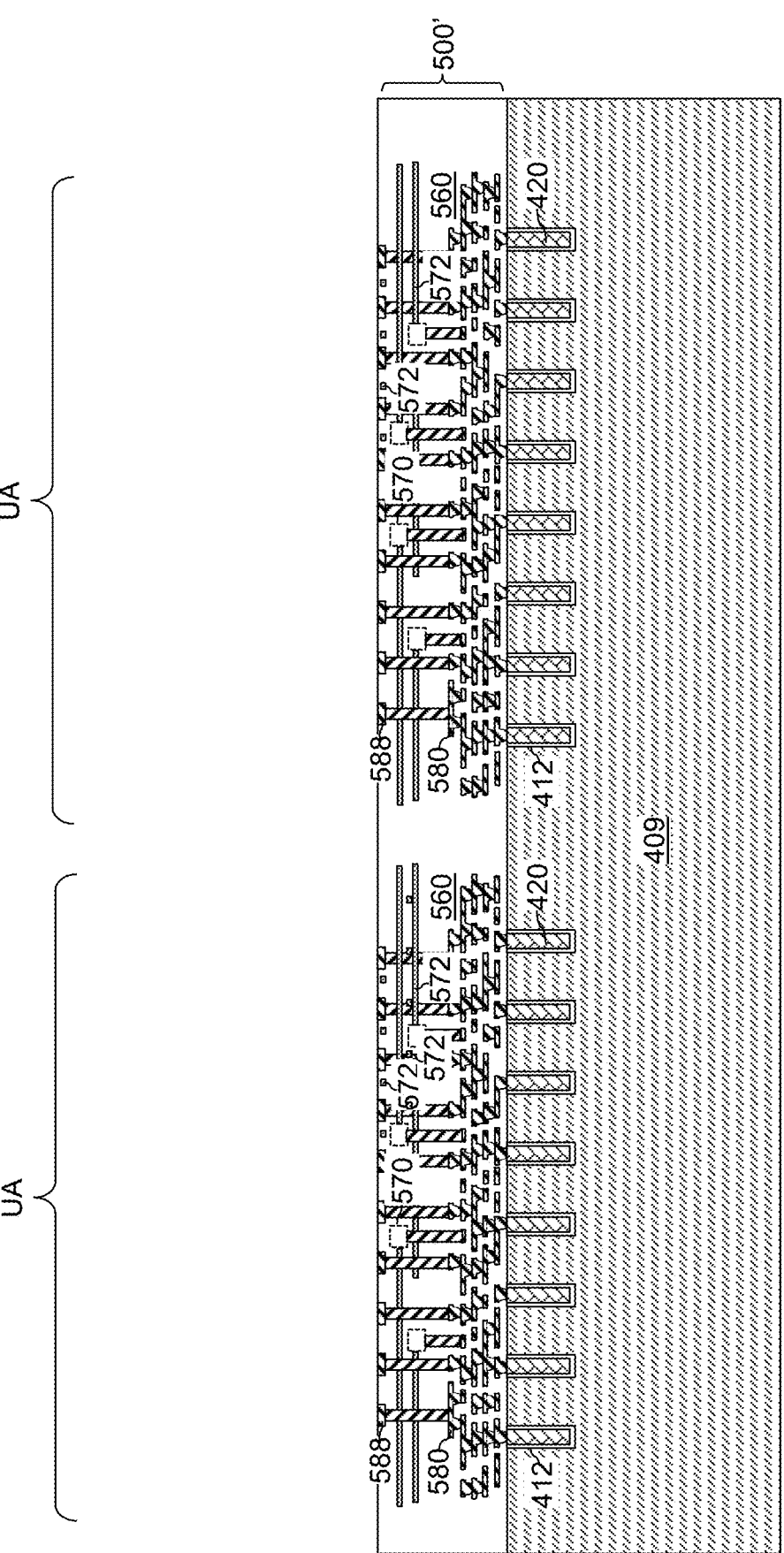
FIG. 3 is a vertical cross-sectional view of the intermediate structure after formation of optical transducers, waveguides, additional metal wiring structures, interposer-side bonding pads, and additional interlayer dielectric layers according to an embodiment of the present disclosure.

Referring to FIG. 3, additional interlayer dielectric layers 560, optical waveguides 572, optional optical transducers 570, and additional metal wiring structures 580, and metallic bonding structures 588 may be formed on each in-process interconnect structure 500', and may be incorporated into a respective in-process interconnect structure 500'. The optical waveguides 572 may comprise any optical waveguide material known in the art, such as silicon, silicon nitride, etc. The width and the height of each optical waveguide 572 may be selected based on the wavelength of photons to be used for transmission through the optical waveguides 572 to ensure that total reflection occurs at interfaces between the optical waveguides 572 and the additional interlayer dielectric layers 560.

A subset of the optical waveguides 572 may be formed in proximity to the topmost surfaces of the in-process interconnect structures 500', and may be configured for evanescent coupling with optical waveguides to be provided in semiconductor dies to be subsequently attached to the in-process interconnect structures 500'. The depth of the subset of the optical waveguides 572 from the horizontal plane including the topmost surfaces of the in-process interconnect structures 500' may be in a range from 30 nm to 200 nm, although lesser and greater depths may also be used. The optical transducers 570, if present, may be embedded in the additional interlayer dielectric layers 560, and may be connected to a respective one of the optical waveguides 572. The optical transducers 570 may be configured to provide conversion between optical signals in the optical waveguides 572 and electrical signals that are transmitted to a subset of the metal wiring structures 580. For example, the optical transducers 570 may comprise a photodetector, a light emitting diode, and/or photonic memory devices.

The metallic bonding structures 588 comprise metallic bonding pads or metallic bonding pillars. For example, the metallic bonding structures 588 may comprise controlled collapse chip connection (C4) bonding pads or chip connection (C2) pillar structures (which are also referred to as microbump structures). Alternatively, the metallic bonding structures 588 may be configured for metal-to-metal bonding. The metallic bonding structures 588 may have a thickness (i.e., a height) in a range from 10 microns to 60 microns, although lesser or greater thicknesses may also be used. In one embodiment, the metallic bonding structures 588 may be formed as an array of microbumps (such as copper pillars) having a lateral dimension in a range from 10 microns to 25 microns, and having a pitch in a range from 20 microns to 50 microns.

Figure 4:
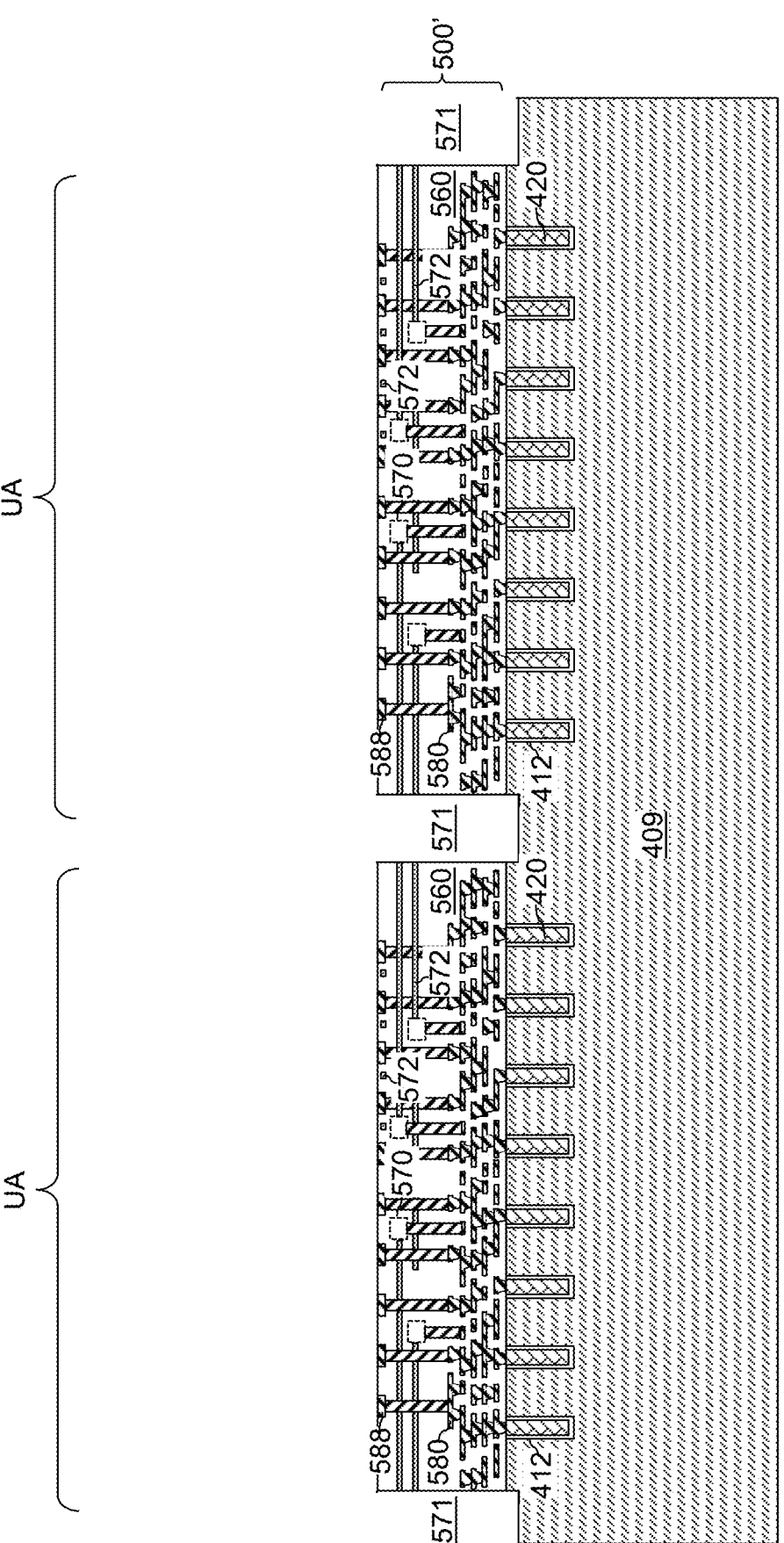
FIG. 4 is a vertical cross-sectional view of the intermediate structure after formation of channel trenches according to an embodiment of the present disclosure.

Referring to FIG. 4, a photoresist layer (not shown) may be applied over the array of in-process interconnect structures 500', and may be lithographically patterned to form two intersecting sets of laterally-extending openings. The width of the laterally-extending openings may be greater than the width of a dicing saw blade to be subsequently used to subsequently dice the array of in-process interconnect structures 500'. For example, the width of the laterally-intersecting openings in the photoresist layer may be in a range from 50 microns to 300 microns, although lesser and greater widths may also be used.

An anisotropic etch process may be performed to transfer the pattern of the laterally-extending openings in the photoresist layer through the array of in-process interconnect structures 500' and into an upper portion of the silicon substrate 409. Two sets of intersecting trenches may be formed in the voids from which materials of the in-process interconnect structures 500' (and specifically, the materials of the interlayer dielectric layers 560) and the silicon substrate 409 are removed. The two sets of intersecting trenches are herein referred to as channel trenches 571. In one embodiment, the channel trenches 571 may comprise first channel trenches that laterally extend along a first horizontal direction and second channel trenches that laterally extend along a second horizontal direction that is perpendicular to the first horizontal direction.

Each patterned portion of an in-process interconnect structure 500' located within a respective unit area UA constitutes an interconnect structure 500. In one embodiment, each interconnect structure 500 may comprise four straight sidewalls that are adjoined among one another at vertically-extending edges. In one embodiment, the channel trenches 571 may be laterally bounded by straight sidewalls of interconnect structures 500, and may have a respective uniform width. Generally, the channel trenches 571 are formed through the interlayer dielectric layers 560 and into an upper portion of the silicon substrate 409 at locations of dicing channels to be subsequently used to singulate the interconnect structures 500. Each interconnect structure 500 may comprise an interconnect interposer.

Figure 5:
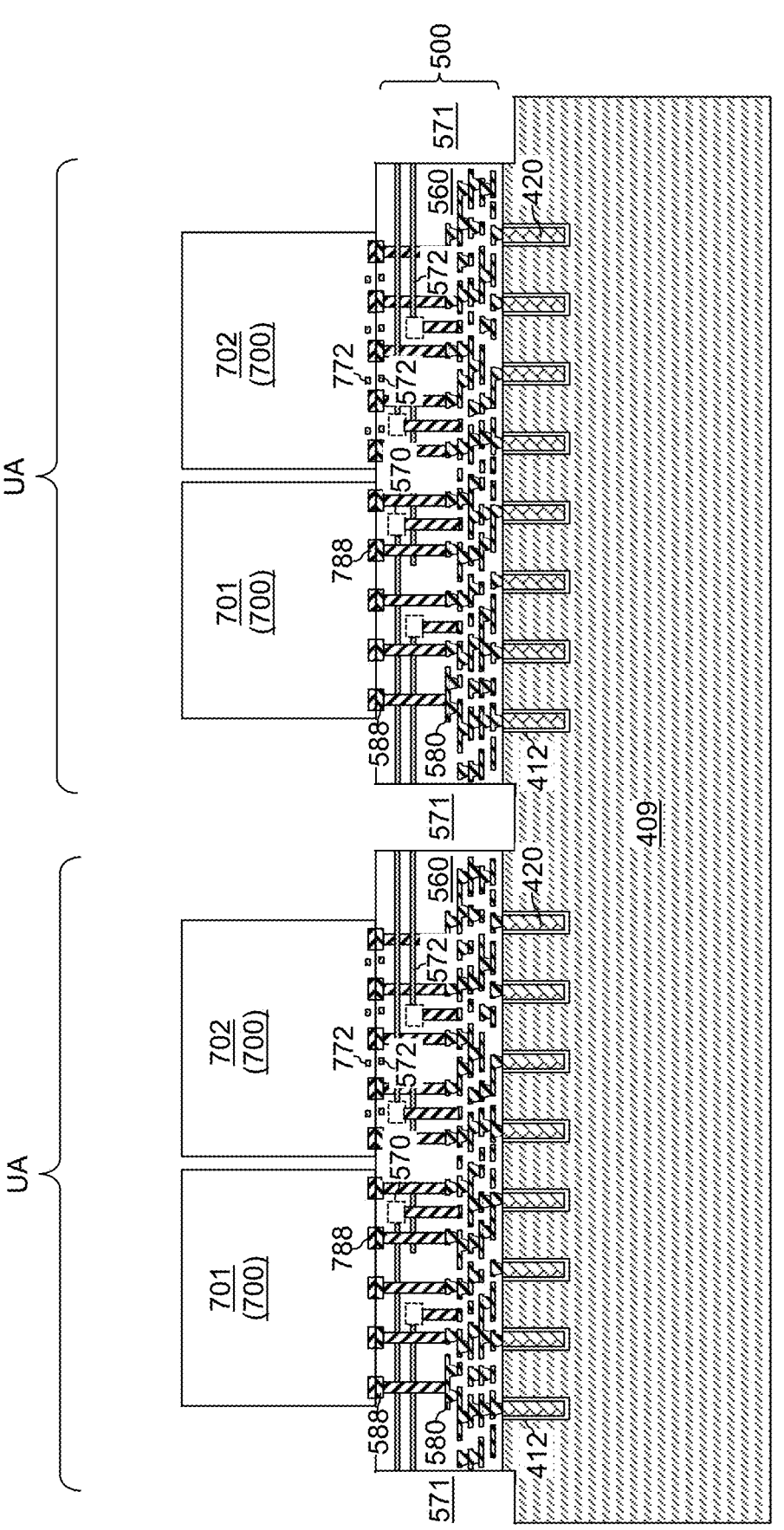
FIG. 5 is a vertical cross-sectional view of the intermediate structure after attaching semiconductor dies to the interconnect interposers according to an embodiment of the present disclosure.

Referring to FIG. 5, at least one semiconductor die 700 may be bonded to a respective interconnect structure 500 located in a respective unit area UA. In one embodiment, a plurality of semiconductor dies 700 may be bonded to a respective interconnect structure 500 in each unit area UA. In one embodiment, the plurality of semiconductor dies 700 may comprise a logic die 701 and an optical device die 702 including optical devices such as optical transducers (not expressly shown). In this case, the optical device die 702 may comprise a plurality of optical waveguides 772 that are arranged in a same configuration as, and located in proximity to, a plurality of optical waveguides 572 in an underlying interconnect structure 500. The pattern of the plurality of optical waveguides 772 may be the same as, and may overlap in a plan view along a vertical direction with, the plurality of optical waveguides 572 in the underlying interconnect structure 500. The vertical distance between facing pairs, i.e., optically coupled pairs, of an optical waveguide 572 in an interconnect structure 500 and an optical waveguide 772 in an optical device die 702 is short enough to enable evanescent coupling between the facing pairs of optical waveguides (572, 772). For example, the vertical distance may be in a range from 60 nm to 400 nm, although lesser and greater vertical distances may also be used. In the presence of evanescent optical coupling, a photon in an optical waveguide 572 in the interconnect structure 500 can transition into an optically coupled optical waveguide 772 in the optical device die 702, and vice versa. The optical transducers in the optical device die can capture photons from the optical waveguides 772, or emit photons into the optical waveguides 772.

In one embodiment, each of the semiconductor dies 700 may comprise a respective array of on-die bonding structures 588 that is configured to be bonded to a respective subset of the metallic bonding structures 588 of a respective interconnect structure 500. The on-die bonding structures 788 may comprise metallic bonding pads configured for direct metal-to-metal bonding. Specifically, the on-die bonding structures 788 may be configured for direct metal-to-metal bonding with a respective array of on-die bonding structures 588. The semiconductor dies 700 can be bonded to a respective one of the interconnect structure 500 by metal-to-metal bonding without use of solder material portions to eliminate any gap between the interconnect structures 500 and the semiconductor dies 700.

Figure 6:
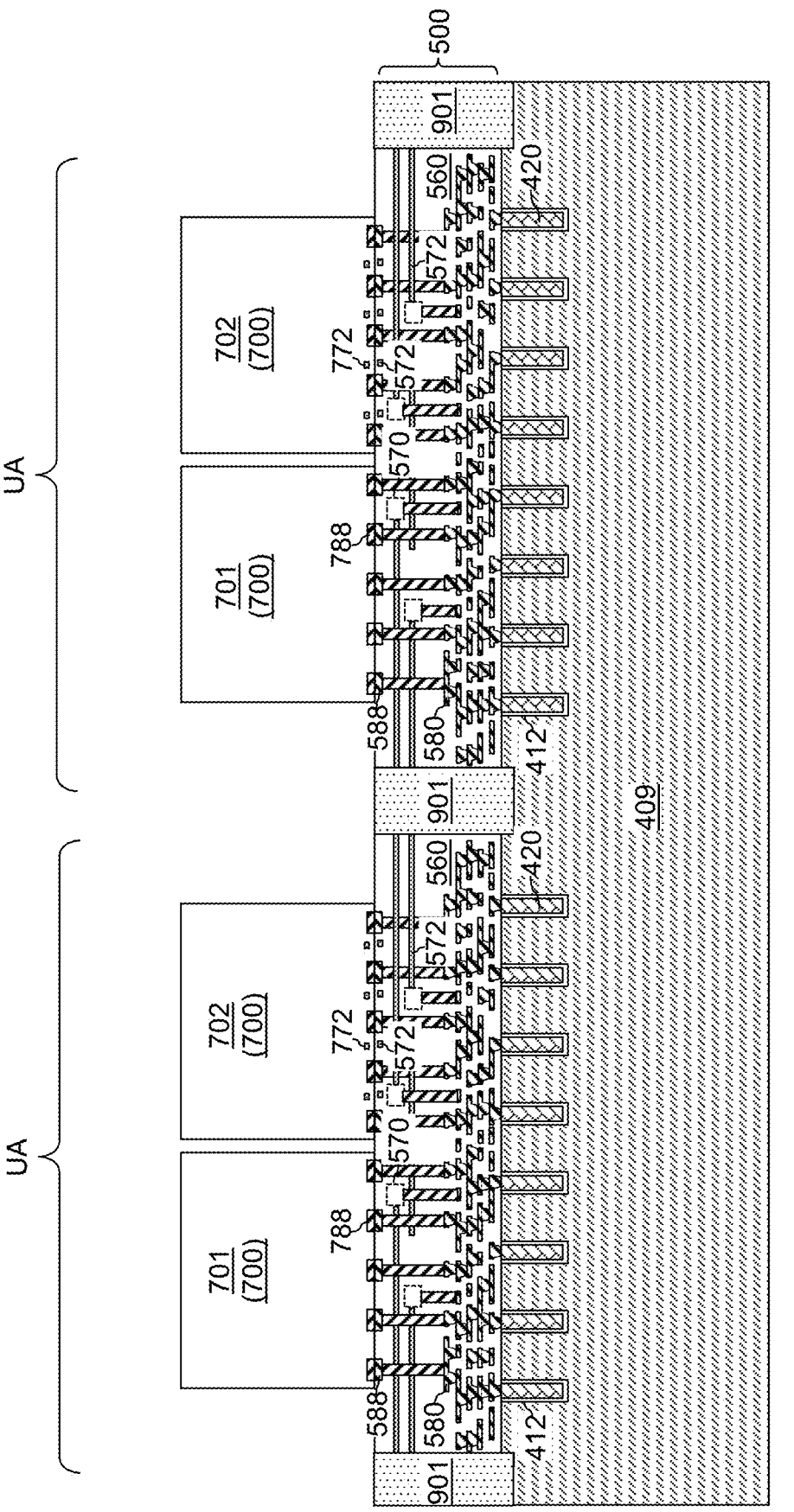
FIG. 6 is a vertical cross-sectional view of the intermediate structure after formation of an optical glue trench fill structure according to an embodiment of the present disclosure.

Referring to FIG. 6, an optical glue material may be conformally deposited in the channel trenches 571. The optical glue material comprises a material that is optically transparent and provides adhesion to various material such as polymer materials, plastic surfaces, semiconductor surfaces, and/or metallic surfaces. Exemplary optical glue materials include epoxy resin-based adhesive materials, ultraviolet-curable adhesive materials, silicone-based adhesive materials, acrylic adhesive materials, polyurethane adhesive materials, etc. Portions of the optical glue material that is formed above the horizontal plane including the topmost surfaces of the two-dimensional array of the interconnect structures 500 may be removed by performing a recess etch process, which may comprise an isotropic etch process or an anisotropic etch process. A suitable cleaning process may be performed after the recess etch process to remove residual portions of the optical glue material from surfaces of the semiconductor dies 700. Remaining portions of the optical glue material filling the channel trenches 571 comprise an optical glue trench fill structure 901, which comprises two intersecting sets of optical glue material rails that laterally extend along a respective horizontal direction. For example, first optical glue material rails may laterally extend along a first horizontal direction, and second optical glue material rails may laterally extend along a second horizontal direction that is perpendicular to the first horizontal direction. Each of the optical glue material rails may have a uniform width, and may contact straight sidewalls of a respective pair of rows of the interconnect structures 500.

Figure 7:
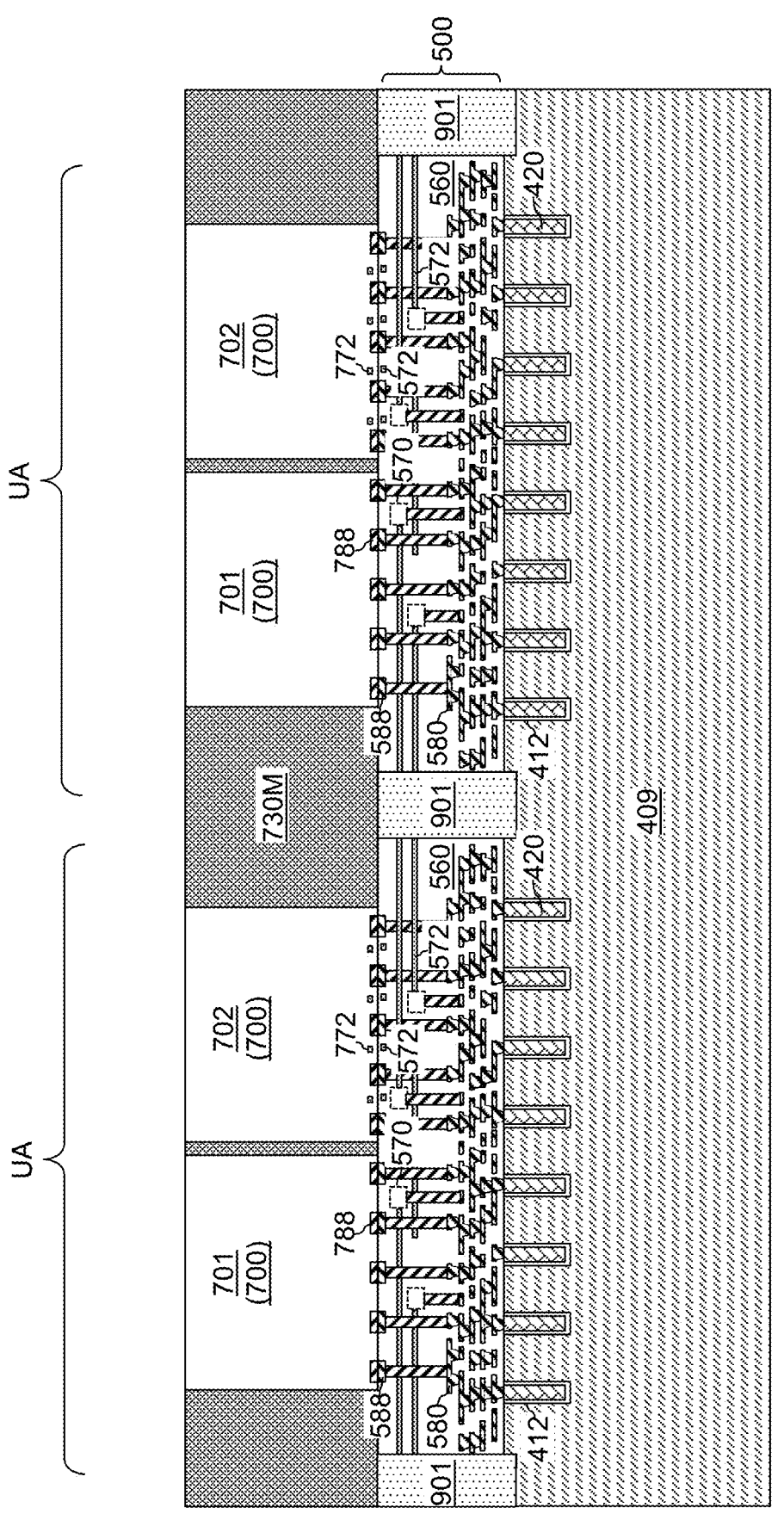
FIG. 7 is a vertical cross-sectional view of the intermediate structure after formation of a molding compound matrix according to an embodiment of the present disclosure.

Referring to FIG. 7, an encapsulant, such as a molding compound (MC) material may be applied to the gaps among the semiconductor dies 700. The MC material may comprise an epoxy-containing compound that may be hardened (i.e., cured) to provide a dielectric material portion having sufficient stiffness and mechanical strength. The MC material may include epoxy resin, hardener, silica (as a filler material), and other additives. The MC material may be provided in a liquid form or in a solid form depending on the viscosity and flowability. Liquid MC materials typically provide better handling, good flowability, less voids, better fill, and less flow marks. Solid MC materials typically provide less cure shrinkage, better stand-off, and less die drift. A high filler content (such as 85% in weight) within an MC material may shorten the time in mold, lower the mold shrinkage, and may reduce the mold warpage. Uniform filler size distribution in the MC material may reduce flow marks, and may enhance flowability.

The MC material may be cured at a curing temperature to form a molding compound (MC) matrix 730M, which is herein referred to as a die-level MC matrix. The MC matrix 730M laterally encloses each of the semiconductor dies 700.

The MC matrix 730M may be a continuous material layer that extends across the entirety of the area of the reconstituted wafer. A planarization process such as a chemical mechanical polishing process may be performed to planarize the MC matrix 730M. The top surface of the MC matrix 730M may be formed within a horizontal plane including the top surfaces of the semiconductor dies 700. Each portion of the MC matrix 730M located within a respective unit are UA constitutes a molding compound (MC) die frame. As such, the MC matrix 730M may include a two-dimensional array of MC interposer frames that are laterally adjoined to one another. Each MC interposer frame may be located within a respective unit area UA, and laterally surrounds a respective set of at least one semiconductor die 700.

The intermediate structure after the processing steps of FIG. 7 comprises a reconstituted wafer that includes the silicon substrate 409, a two-dimensional array of interconnect structure 500 (which is a two-dimensional array of interconnect interposers each including optical waveguides 572 and optionally including optical transducers 570), a two-dimensional array of at least one semiconductor die 700, and molding compound matrix 730M (which includes a two-dimensional array of molding compound die frames).

Figure 8:
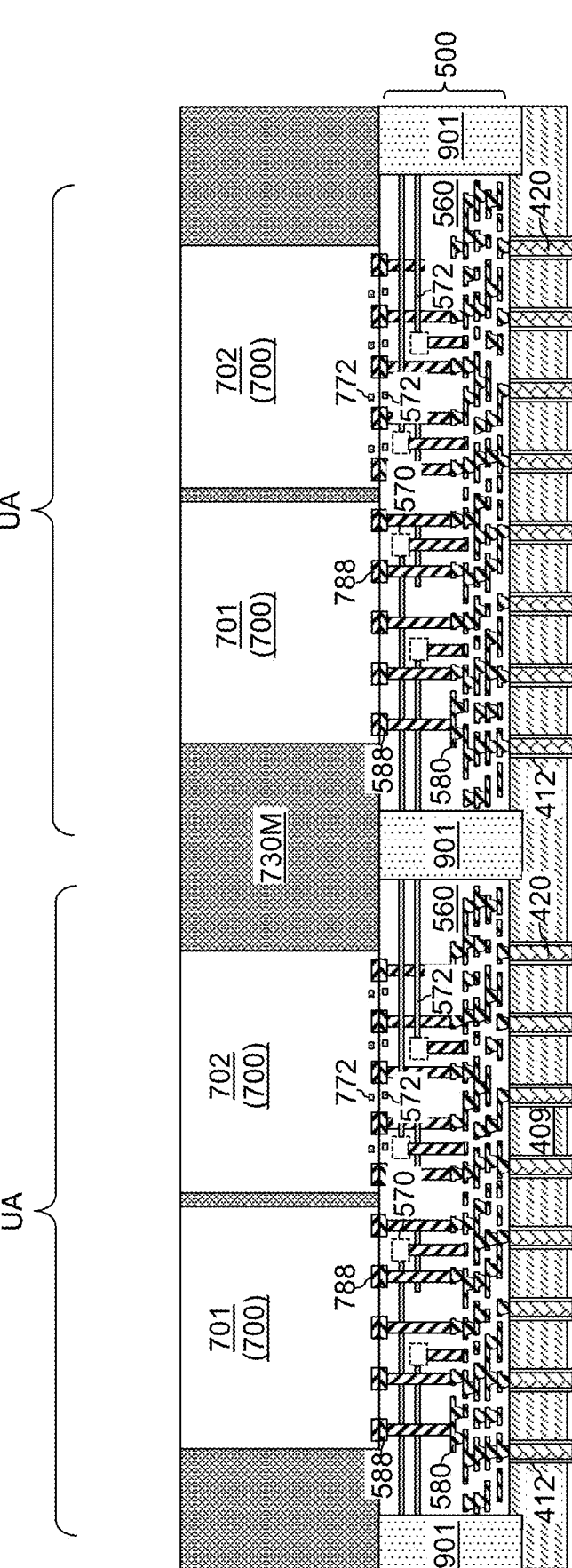
FIG. 8 is a vertical cross-sectional view of the intermediate structure after thinning the backside of the silicon substrate according to an embodiment of the present disclosure.

Referring to FIG. 8, the silicon substrate 409 may be thinned from the backside, for example, by performing a grinding process, a polishing process, an anisotropic etch process, and/or an isotropic etch process. The bottom portions of the dielectric spacers 412 and/or the through-silicon via structures 420 may function as stopping structures for a final step of the thinning process, which may comprise a polishing step, an anisotropic etch step, or an isotropic etch step. The thickness of the silicon substrate 409 after the thinning process may be in a range from 2 microns to 30 microns, such as from 6 microns to 15 microns, although lesser and greater thicknesses may also be used.

Figure 9:
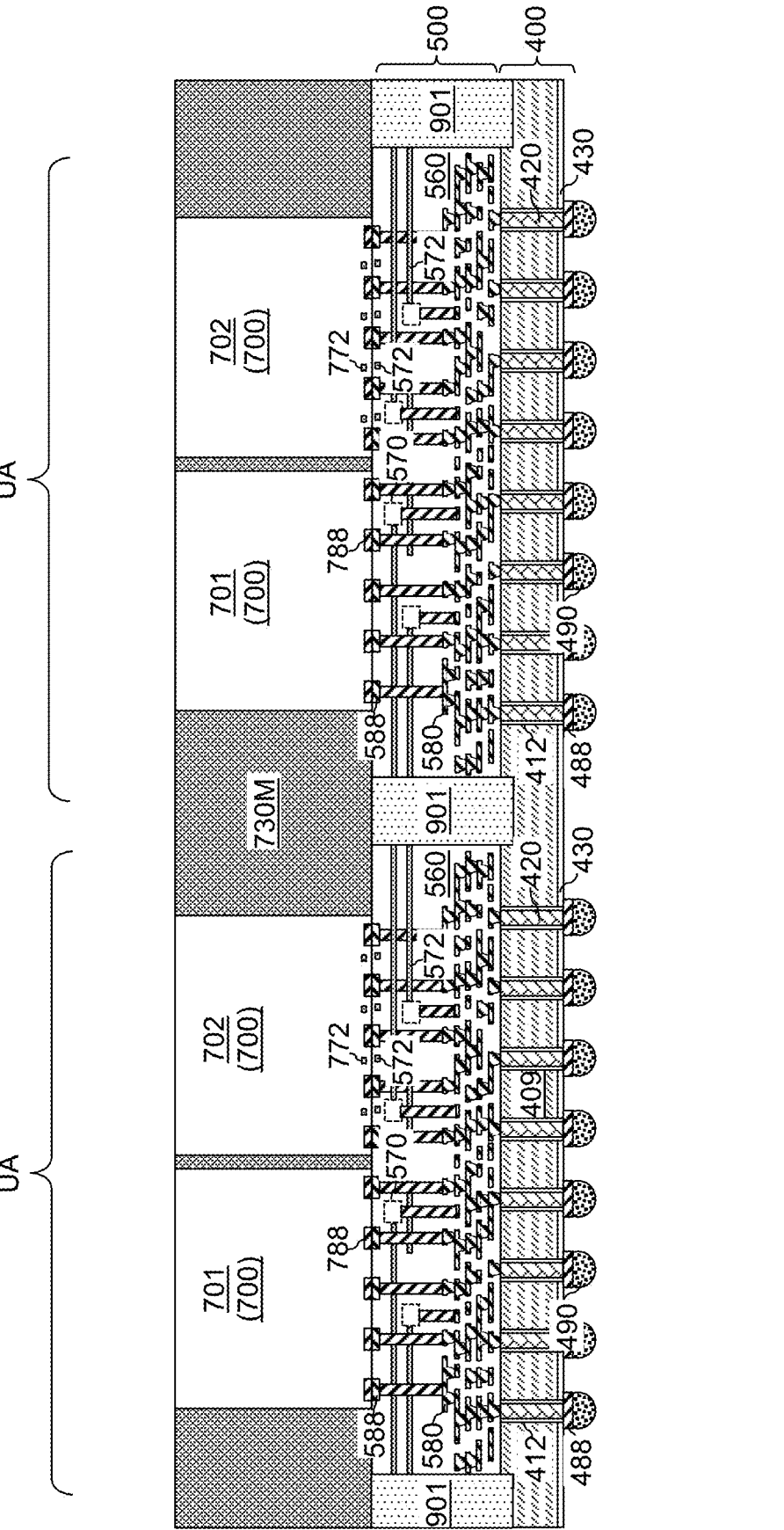
FIG. 9 is a vertical cross-sectional view of the intermediate structure after forming interposer-side bonding pads and arrays of solder material portions according to the first embodiment of the present disclosure.

Referring to FIG. 9, a selective etch process that etches silicon in the silicon substrate 409 selective to the materials of the dielectric spacers 412 and the through-silicon via structures 420 may be performed to vertically recess the physically exposed backside surface of the silicon substrate 409. For example, a wet etch process using a potassium hydroxide (KOH) solution or a tetramethylammonium hydroxide (TMAH) solution may be performed to vertically recess the backside surface of the silicon substrate 409. A dielectric material (such as undoped silicate glass or a doped silicate glass) may be deposited on the vertically recessed backside surface of the silicon substrate 409, and a planarization process such as a chemical mechanical polishing process may be performed to provide a planar surface that is coplanar with bottom surfaces of the through-silicon via structures 420. The remaining horizontally-extending portion of the deposited and planarized dielectric material constitutes a backside dielectric layer 430, which may have a thickness in a range from 50 nm to 500 nm, although lesser and greater thicknesses may also be used.

An underbump metallurgy (UBM) layer stack may be subsequently deposited on the physically exposed backside surfaces of the through-silicon via structures 420 and on the backside surface of the backside dielectric layer 430. The UBM layer stack may be patterned into discrete material portions contacting a bottom surface of a respective one of the through-silicon via structures 420 to form interposer-side bonding pads 488, which may comprise C4 bonding pads. The combination of the silicon substrate 409, the through-silicon via structures 420, the dielectric spacers 412, the backside dielectric layer 430, and the interposer-side bonding pads 488 may comprise a two-dimensional array of silicon interposers 400. Each silicon interposer 400 can be located within a respective unit area UA. Solder material portions 490 may be formed on each of the interposer-side bonding pads 488.

The reconstituted wafer comprises a two-dimensional array of composite interposers (400, 500). Each composite interposer comprises an interconnect interposer, which is an interconnect structure 500 located within a respective unit area UA. Each composite interposer further comprises a silicon interposer 400, which comprises a portion of the silicon substrate 409, an array of through-substrate via structures 420, an array of dielectric spacers 412, an array of interposer-side bonding pads 488, and a portion of the backside dielectric layer 430 that are located within a respective unit area UA. The reconstituted wafer further comprises a two-dimensional array of semiconductor dies 700 and an MC matrix 730M.

Figure 10:
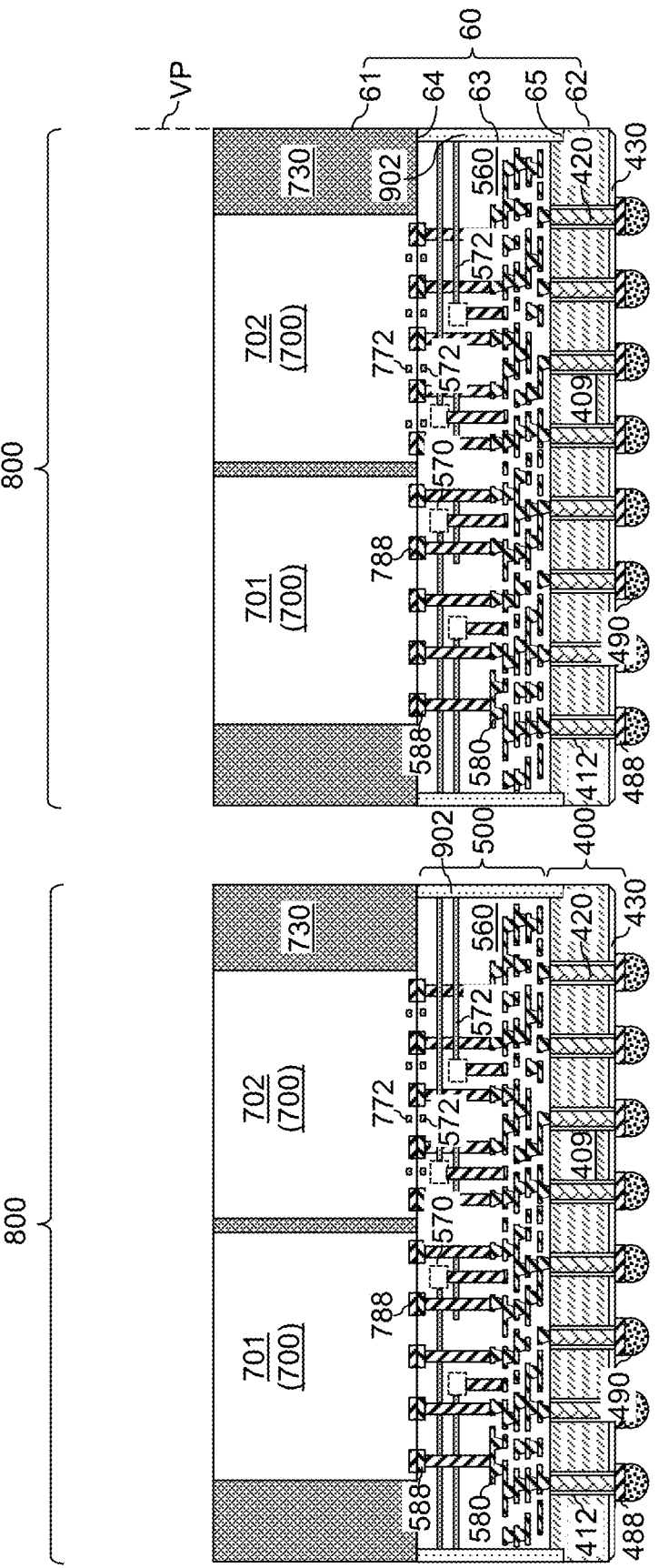
FIG. 10 is a vertical cross-sectional view of the intermediate structure after dicing a reconstituted wafer into composite semiconductor packages according to an embodiment of the present disclosure.

Referring to FIG. 10, the reconstituted wafer may be diced along dicing channels by performing a dicing process. Specifically, the molding compound matrix 730M and the array of composite interposer (400, 500) may be diced into discrete composite semiconductor packages 800. The dicing channels correspond to the boundaries between neighboring pairs of unit areas UA, and are located at middle portions of the optical glue material rails in the optical glue trench fill structure 901. In one embodiment, the width of the dicing blade may be less than the width of each optical glue material rail of the optical glue trench fill structure 901.

Each diced unit from the reconstituted wafer comprises a composite semiconductor package 800. A contiguous combination of a silicon interposer 400 and an interconnect structure 500, which is an interconnect interposer, comprises a composite interposer (400, 500). Each composite interposer (400, 500) is a diced portion of the two-dimensional array of composite interposers within the reconstituted wafer as provided after the processing steps of FIG. 9. Each composite semiconductor package 800 comprises a respective silicon interposer 400 that comprises a diced portion of the silicon substrate 409, an array of through-substrate via structures 420, a backside dielectric layer 430, and an array of interposer-side bonding pads 488. Each composite semiconductor package 800 comprises a respective interconnect structure 500 which is an interconnect interposer. Each diced portion of the MC matrix 730M constitutes a molding compound die frame 730, i.e., an MC die frame 730. Thus, each composite semiconductor package 800 comprises at least one semiconductor die 700 and an MC die frame 730.

According to an aspect of the present disclosure, a remaining portion of the optical glue trench fill structure 901 may be provided on each composite semiconductor package 800. Each remaining portion of the optical glue trench fill structure 901 is herein referred to as a first optical glue portion 902, which is located on a respective composite interposer (400, 500) upon dicing the reconstituted wafer. Each composite interposer (400, 500) comprises metal wiring structures 580 and optical waveguides 572 that are embedded in interlayer dielectric layers 560. Each first optical glue portion 902 may be provided on a stepped outer sidewall 60 of a respective composite semiconductor package 800. Further, each first optical glue portion 902 may be provided on a stepped outer sidewall (62, 63, 65) of a respective composite interposer (400, 500).

In one embodiment, a stepped outer sidewall 60 of a composite semiconductor package 800 may comprise a first outermost vertical surface segment 61 located within a vertical plane VP (which may be a planar vertical plane located within a vertical Euclidean plane), a second outermost vertical surface segment 62 located within the vertical plane VP, a laterally-recessed sidewall segment 63 that is laterally recessed inward (i.e., toward the interconnect structure 500) relative to the vertical plane VP, a first connecting horizontal surface segment 64 that connects an edge of the first outermost vertical surface segment 61 to an edge of the laterally-recessed sidewall segment 63, and a second connecting horizontal surface segment 65 that connects an edge of the second outermost vertical surface segment 62 to another edge of the laterally-recessed sidewall segment 63.

In one embodiment, the composite semiconductor package 800 comprises an interconnect interposer (comprising an interconnect structure 500) and a silicon interposer 400 including a silicon substrate 409 and a plurality of through-substrate via structures 420 that vertically extending through the silicon substrate 409; the laterally-recessed sidewall segment 63 comprise a sidewall surface segment of the silicon interposer 400 and a sidewall surface segment of the interconnect interposer; and the second connecting horizontal surface segment 65 comprises a horizontal surface segment of the silicon interposer 400. In one embodiment, the entirety of the laterally-recessed sidewall segment 63 may be a straight planar sidewall, and thus, the sidewall surface segment of the silicon interposer 400 and the sidewall surface segment of the interconnect interposer may be located within another vertical plane. In one embodiment, the first connecting horizontal surface segment 64 comprises a horizontal surface segment of an MC die frame 730, and may be located within a same horizontal plane as the top surface of the interconnect structure 500 (i.e., the interconnect interposer).

In one embodiment, the composite interposer (400, 500) comprises a stepped outer sidewall (62, 63, 65) comprising an outermost vertical surface segment (such as the second outermost vertical surface segment 62), a laterally-recessed sidewall segment 63 that is laterally recessed relative to the outermost vertical surface segment, and a connecting horizontal surface segment (such as the second connecting horizontal surface segment 65) that connects the outermost vertical surface segment and the laterally-recessed vertical sidewall segment. In one embodiment, at least one semiconductor die 700 may be attached to metallic bonding structures 588 of the composite interposer (400, 500).

In one embodiment, a molding compound die frame 730 laterally surrounds the at least one semiconductor die 700. The outermost vertical surface segment (such as the second outermost vertical surface segment 62) is located in a same vertical plane VP as a sidewall of the molding compound die frame 730, which comprises a first outermost vertical surface segment 61 of the stepped outer sidewall 60 of the composite semiconductor package 800. In one embodiment, the laterally-recessed sidewall segment 63 vertically extends from a topmost surface of the interlayer dielectric layers 560 at least to a bottommost surface of the interlayer dielectric layers 560, and may extend to a recessed horizontal surface of a silicon interposer 400, which comprises the second connecting horizontal surface segment 65 of the stepped outer sidewall 60 of the composite semiconductor package 800.

In one embodiment, the composite interposer (400, 500) comprises a silicon interposer 400 including a silicon substrate 409 and a plurality of through-substrate via structures 420 that vertically extending through the silicon substrate 409; and the laterally-recessed sidewall segment 63 comprise a sidewall surface segment of the silicon interposer 400. In one embodiment, the outermost vertical surface segment (such as the second outermost vertical surface segment 62 of the stepped outer sidewall 60 of the composite semiconductor package 800) comprises a sidewall surface segment of the silicon interposer 400; and the connecting horizontal surface segment (such as the second connecting horizontal surface segment 65 of the stepped outer sidewall 60 of the composite semiconductor package 800) comprises a horizontal surface segment of the silicon interposer 400.

In one embodiment, the first optical glue portion 902 may have a configuration of a rectangular frame having a uniform height, a set of four inner vertical sidewalls, and a set of four outer vertical sidewalls. In one embodiment, the lateral distance between neighboring pairs of an inner vertical sidewall and an outer vertical sidewall of each first optical glue portion 902 may be in a range from 10 microns to 200 microns, such as from 20 microns to 100 microns, although lesser and greater lateral distances may also be used. Alternatively, the dicing of the optical glue trench fill structure 901 may be performed off-centered relative to the geometrical centers of the optical glue material rails, and the first subset of sidewalls of a composite semiconductor package 800 may comprise a first optical glue portion 902 and a stepped outer sidewall 60, and a second subset of the sidewalls of the composite semiconductor package 800 may be free of any optical glue portion 902 and may consist of a respective straight sidewall.

Figure 11:
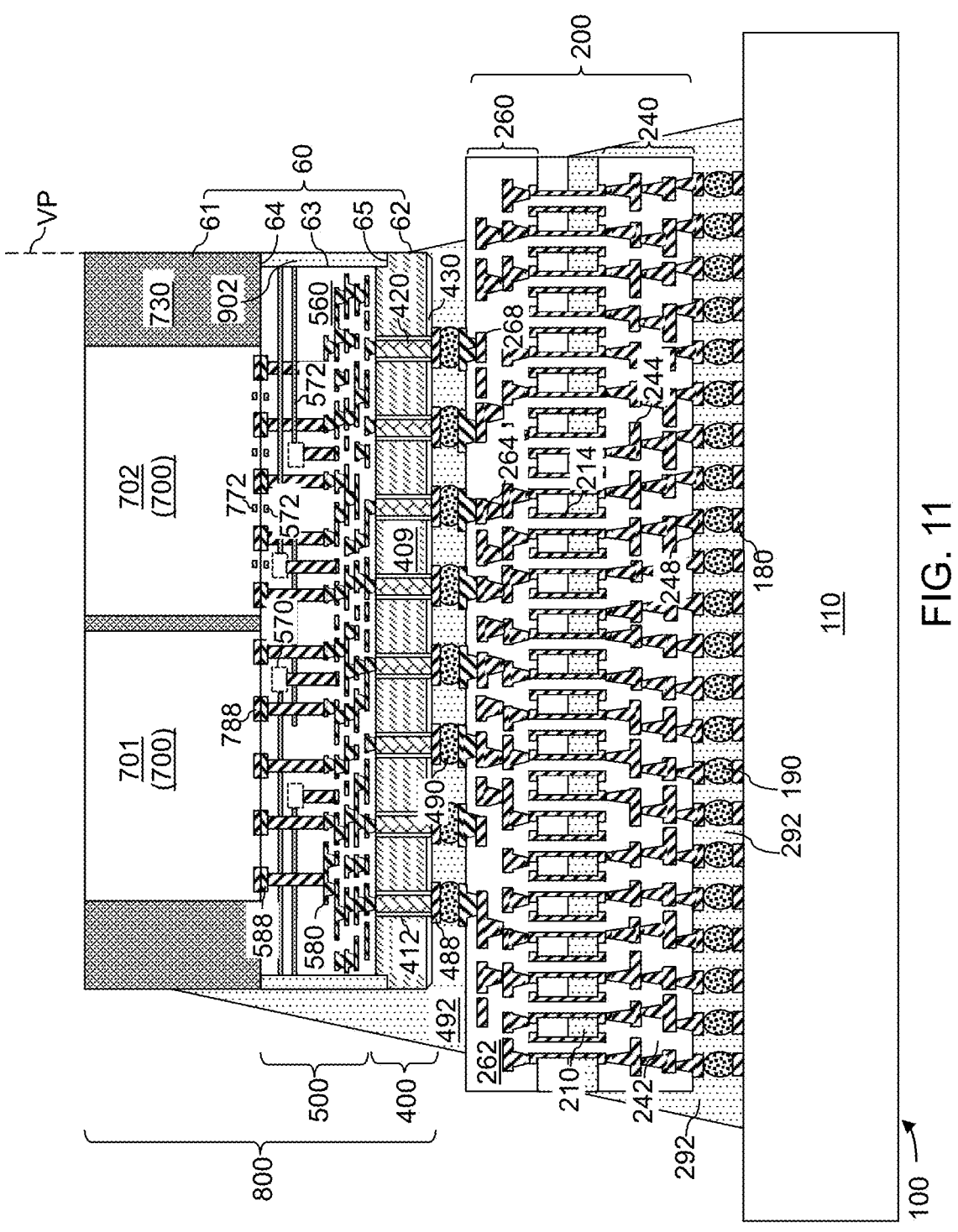
FIG. 11 is vertical cross-sectional view of the intermediate structure after attaching a composite semiconductor package to a packaging substrate, and after attaching the packaging substrate to a printed circuit board according to an embodiment of the present disclosure.

Referring to FIG. 11, the composite semiconductor package 800 may be bonded to a packaging substrate 200. The packaging substrate 200 may be a cored packaging substrate including a core substrate 210, or a coreless packaging substrate that does not include a package core. Alternatively, the packaging substrate 200 may include a system-on-integrated packaging substrate (SoIS) including redistribution layer, dielectric interlayers, and/or at least one embedded interposer (such as a silicon interposer). Such a system-integrated packaging substrate may include layer-to-layer interconnections using interposer-side solder material portions, microbumps, underfill material portions (such as molded underfill material portions), and/or an adhesion film. While the present disclosure is described using a cored packaging substrate, it is understood that the scope of the present disclosure is not limited by any particular type of substrate package. For example, a SoIS may be used in lieu of a cored packaging substrate. In embodiments in which a SoIS is used, the core substrate 210 may include a glass epoxy plate including an array of through-plate holes. An array of through-core via structures 214 including a metallic material may be provided in the through-plate holes. Each through-core via structure 214 may, or may not, include a cylindrical hollow therein. Optionally, dielectric liners (not illustrated) may be used to electrically isolate the through-core via structures 214 from the core substrate 210.

The packaging substrate 200 may include board-side surface laminar circuit (SLC) 240 and a chip-side surface laminar circuit (SLC) 260. The board-side SLC may include board-side insulating layers 242 having formed therein board-side wiring interconnects 244. The chip-side SLC 260 may include chip-side insulating layers 262 having formed therein chip-side wiring interconnects 264. The board-side insulating layers 242 and the chip-side insulating layers 262 may include a photosensitive epoxy material that may be lithographically patterned and subsequently cured. The board-side wiring interconnects 244 and the chip-side wiring interconnects 264 may include copper that may be deposited by electroplating within patterns in the board-side insulating layers 242 or the chip-side insulating layers 262.

In one embodiment, the chip-side surface laminar circuit 260 comprises chip-side wiring interconnects 264 that are connected to an array of substrate bonding pads 268. The array of substrate bonding pads 268 may be configured to allow bonding through C4 solder balls. The board-side surface laminar circuit 240 comprises board-side wiring interconnects 244 that are connected to an array of board-side bonding pads 248. The array of board-side bonding pads 248 is configured to allow bonding through solder joints having a greater dimension than the C4 solder balls. While the present disclosure is described using an embodiment in which the packaging substrate 200 includes a chip-side surface laminar circuit 260 and a board-side surface laminar circuit 240, embodiments are expressly contemplated herein in which one of the chip-side surface laminar circuit 260 and the board-side surface laminar circuit 240 is omitted, or is replaced with an array of bonding structures such as microbumps. In an illustrative example, the chip-side surface laminar circuit 260 may be replaced with an array of microbumps or any other array of bonding structures.

In one embodiment, the packaging substrate 200 comprises a first horizontal surface configured to face the composite semiconductor package 800. The first horizontal surface is the surface that faces the substrate-facing horizontal surface of the composite semiconductor package 800 during a subsequent assembly process. The packaging substrate 200 further comprises a second horizontal surface located on an opposite side of the first horizontal surface. The substrate bonding pads 268 of the packaging substrate 200 may be located on the first horizontal surface of the packaging substrate 200, and may have a mirror image pattern of the pattern of the interposer-side bonding pads 488.

Specifically, each of the solder material portions 490 may be bonded to a respective one of the substrate bonding pads 268 and to a respective one of the interposer-side bonding pads 488. A reflow process may be performed to reflow the solder material portions 490 such that each solder material portion 490 is bonded to a respective one of the substrate bonding pads 268 and to a respective one of the interposer-side bonding pads 488.

An underfill material may be applied into a gap between the composite interposer (400, 500) and the packaging substrate 200. The underfill material may comprise any underfill material known in the art. An underfill material portion may be formed around the array of interposer-side bonding pads 488, the array of substrate bonding pads 268, and the array of solder material portions 490 in the gap between the composite interposer (400, 500) and the packaging substrate 200. This underfill material portion is formed between the composite interposer (400, 500) and the packaging substrate 200, and thus, is herein referred to as an interposer-package underfill material portion 492, or as an IP underfill material portion 492. A stiffener ring (not shown) may be attached to the physically exposed surface of the molding compound die frame 730 (i.e., an MC die frame 730) using, for example, an adhesive layer (not shown).

A printed circuit board (PCB) 100 including a PCB substrate 110 and PCB bonding pads 180 may be provided. The PCB 100 includes a printed circuitry (not shown) at least on one side of the PCB substrate 110. An array of solder joints 190 may be formed to bond the array of board-side bonding pads 248 to the array of PCB bonding pads 180. The solder joints 190 may be formed by disposing an array of solder balls between the array of board-side bonding pads 248 and the array of PCB bonding pads 180, and by reflowing the array of solder balls. An additional underfill material portion, which is herein referred to as a board-substrate underfill material portion 292 or a BS underfill material portion 292, may be formed around the solder joints 190 by applying and shaping an underfill material. The packaging substrate 200 is attached to the PCB 100 through the array of solder joints 190.

Figure 12:
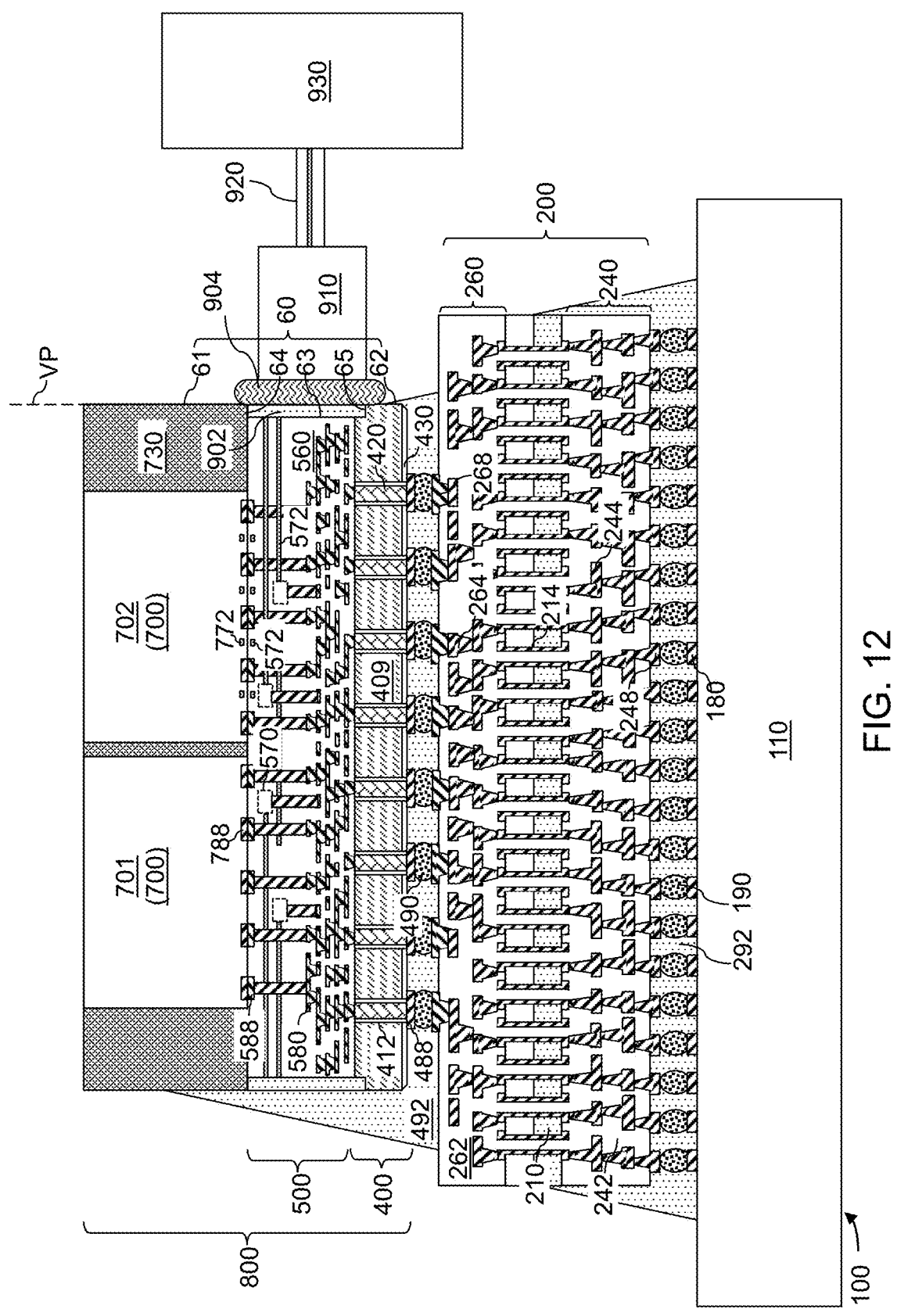
FIG. 12 is vertical cross-sectional view of the intermediate structure after attaching a fiber access unit to the composite semiconductor package according to an embodiment of the present disclosure.

Referring to FIG. 12, a fiber access unit 910 may be attached to the composite semiconductor package 800 using a second optical glue portion 904. As used herein, a fiber access unit (FAU) 910 refers to any external device that may optically couple with the optical waveguide 572. In some embodiments, the FAU 910 may be referred to as a fiber array unit 910. The fiber access unit 910 may serve as an interface device between an external optical system and the optical waveguide 572 within a semiconductor device such as the interconnect structure 500 within the composite semiconductor package 800. The external optical system may comprise a module transceiver 930 which is optically coupled to the fiber access unit 910 through an optical cable 920. The module transceiver 930 may perform the functions of transmitting and receiving optical signals. In other words, the module transceiver 930 converts electrical signals into optical signals for transmission through the optical cable 920 and vice versa.

According to an aspect of the present disclosure, a first end of the fiber access unit 910 may be optically coupled to a subset of the optical waveguides 572 through a combination of the first optical glue portion 902 and the second optical glue portion 904. In one embodiment, the first optical glue portion 902 is formed on a composite interposer (400, 500) upon dicing the array of composite interposers (400, 500). The second optical glue portion 904 may comprise any material that may be used for the first optical glue portion 902, and may be applied in a sufficient quantity to provide reliable and strong adhesion between the first optical glue portion 902 and the fiber access unit 910. In one embodiment, the first optical glue portion 902 contacts the laterally-recessed sidewall segment 63 and has an outer sidewall within a vertical plane VP including the first outermost vertical surface segment 61; and the second optical glue portion 904 contacting the first end of the fiber access unit 910 and having an inner sidewall that contact the outer sidewall of the first optical glue portion 902. The thickness of the second optical glue portion 904 may be in a range from 20 microns to 400 microns, although lesser and greater thicknesses may also be used.

Generally speaking, at least one optical glue portion (902, 904) is interposed between the fiber access unit 910 and the laterally-recessed sidewall segment 63 of the stepped outer sidewall 60. In one embodiment, the at least one optical glue portion (902, 904) is in contact with a horizontal bottom surface segment of the molding compound die frame 730 (which is the first connecting horizontal surface segment 64 of the stepped outer sidewall) and a bottom portion of the sidewall of the molding compound die frame 730 (which is the first outermost vertical surface segment 61 of the stepped outer sidewall 60).

Figure 13:
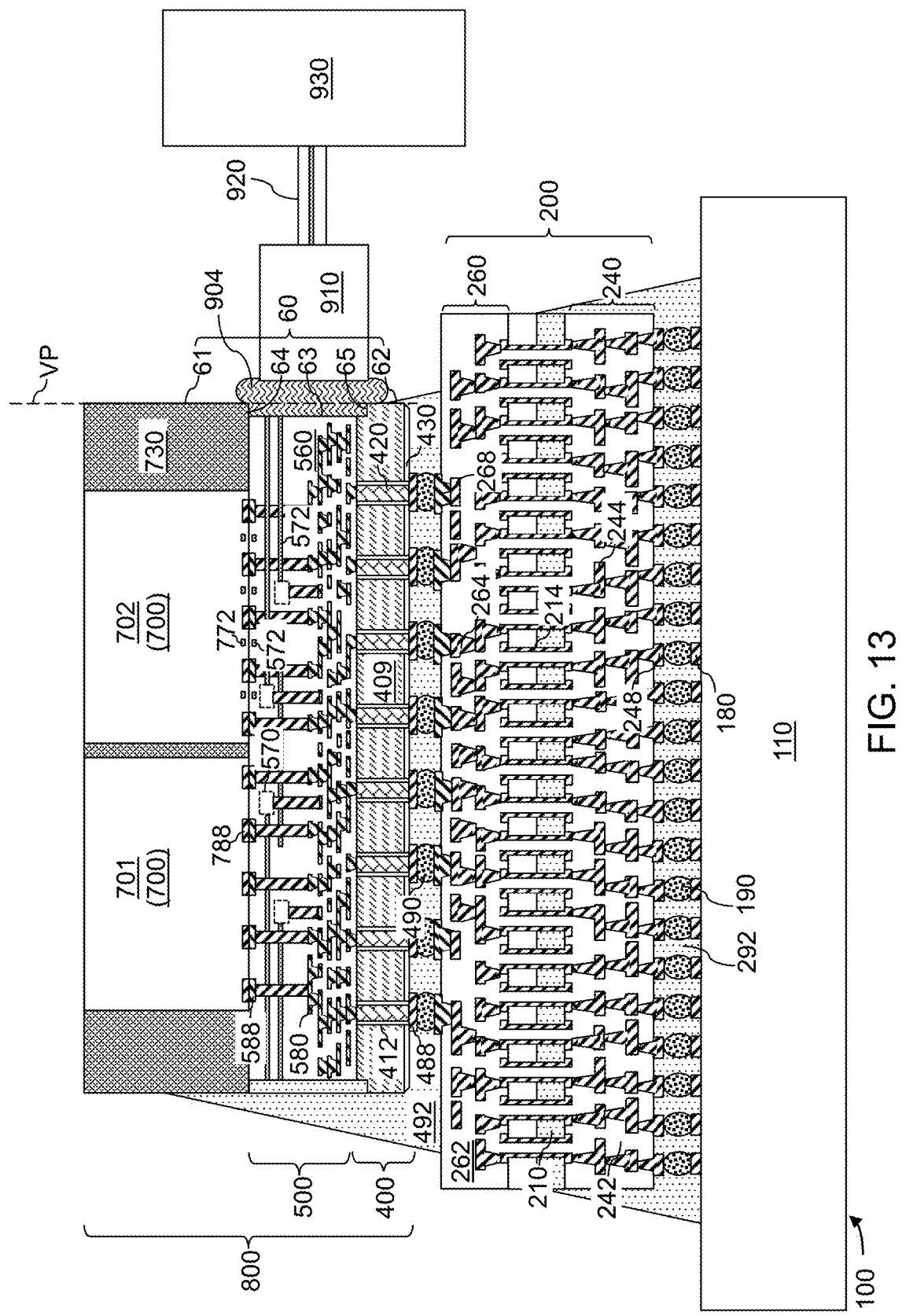
FIG. 13 is vertical cross-sectional view of a first alternative embodiment of the exemplary structure after attaching a fiber access unit to the composite semiconductor package according to an embodiment of the present disclosure.

Referring to FIG. 13, a first alternative embodiment of the exemplary structure may be derived from the exemplary structure illustrated in FIG. 12 by removing the first optical glue portion 902 locally or fully such that the laterally-recessed sidewall segment 63 of the stepped outer sidewall 60 is physically exposed prior to formation of the second optical glue portion 904. In this embodiment, a suitable selective clean process may be performed to remove the first optical glue portion 902 selective to the interlayer dielectric layers 560 prior to formation of the second optical glue portion 904. The second optical glue portion 904 may be formed directly on the laterally-recessed sidewall segment 63 of the stepped outer sidewall 60.

Alternatively, a sacrificial fill material such as amorphous carbon, diamond-like carbon, or a polymer material may be used in lieu of the optical glue material for the optical glue trench fill structure 901. In this embodiment, the sacrificial fill material may be removed at any processing step after dicing of the redistribution wafer and prior to formation of the second optical glue portion 904. In other words, the optical glue material used for the optical glue trench fill structure 901 may be replaced with any sacrificial fill material, which may be removed after the dicing process that forms the composite semiconductor packages 800.

In the first alternative configuration of the exemplary structure, a fiber access unit 910 may be attached to a composite semiconductor package 800 using a single optical glue portion 904, which may have a homogeneous material composition throughout, and may contact the laterally-recessed sidewall segment 63 and the first end of the fiber access unit 910. The thickness of the second optical glue portion 904 may be in a range from 20 microns to 400 microns, although lesser and greater thicknesses may also be used.

Figure 14:
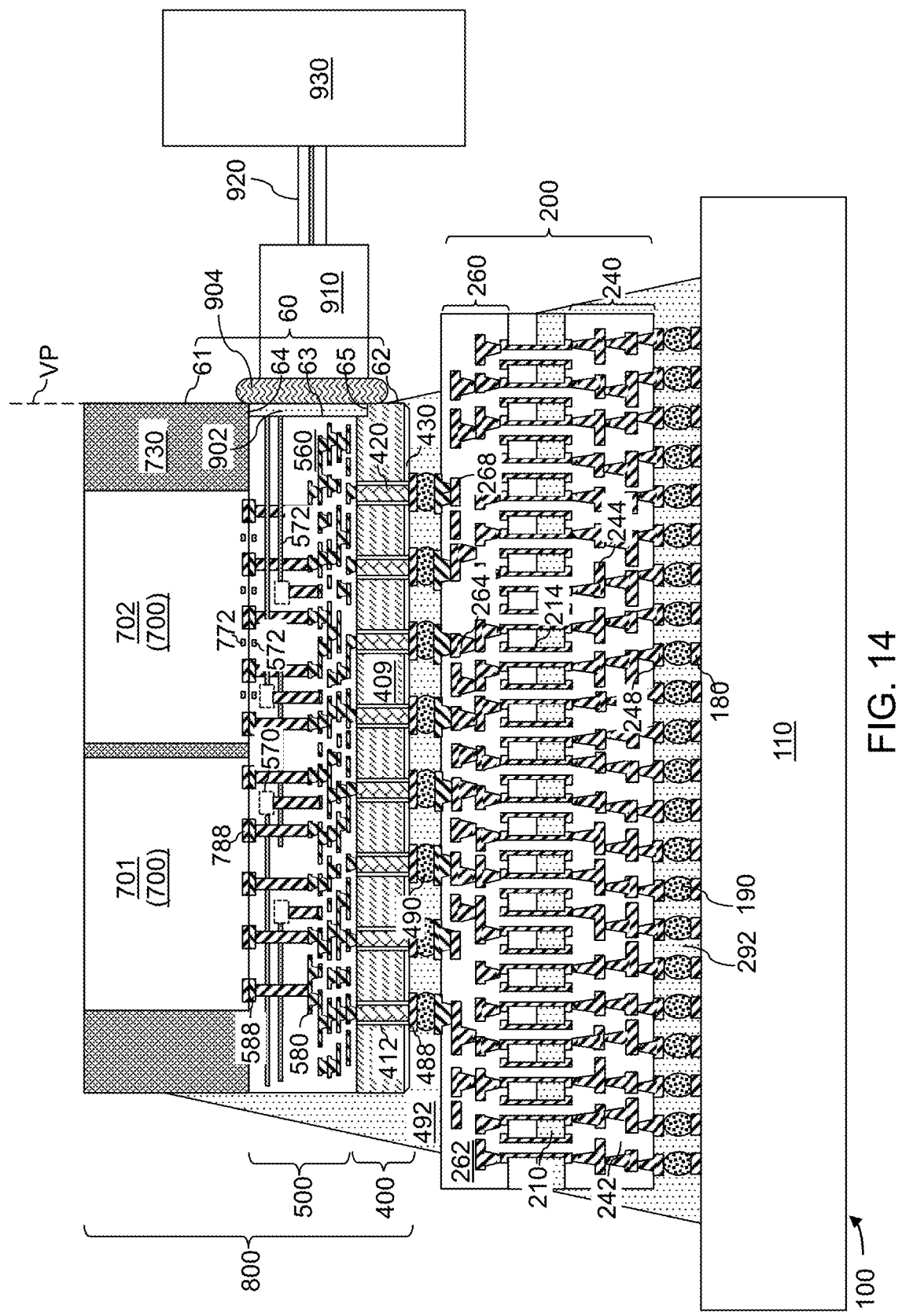
FIG. 14 is vertical cross-sectional view of a second alternative embodiment of the exemplary structure after attaching a fiber access unit to the composite semiconductor package according to an embodiment of the present disclosure.

Referring to FIG. 14, a second alternative configuration of the exemplary structure may be derived from any of the above configurations for the exemplary structure by forming a first optical glue portion 902 or a sacrificial material portion on less than four sidewalls of the composite interposer (400, 500). In this embodiment, the first optical glue portion 902 or the sacrificial material portion may be formed on one, two, or three sidewalls of the composite interposer (400, 500). The composite semiconductor package 800 may comprise one, two, or three stepped outer sidewalls, and comprises at least one straight sidewall that is contained entirely within a planar vertical plane.

Figure 15:
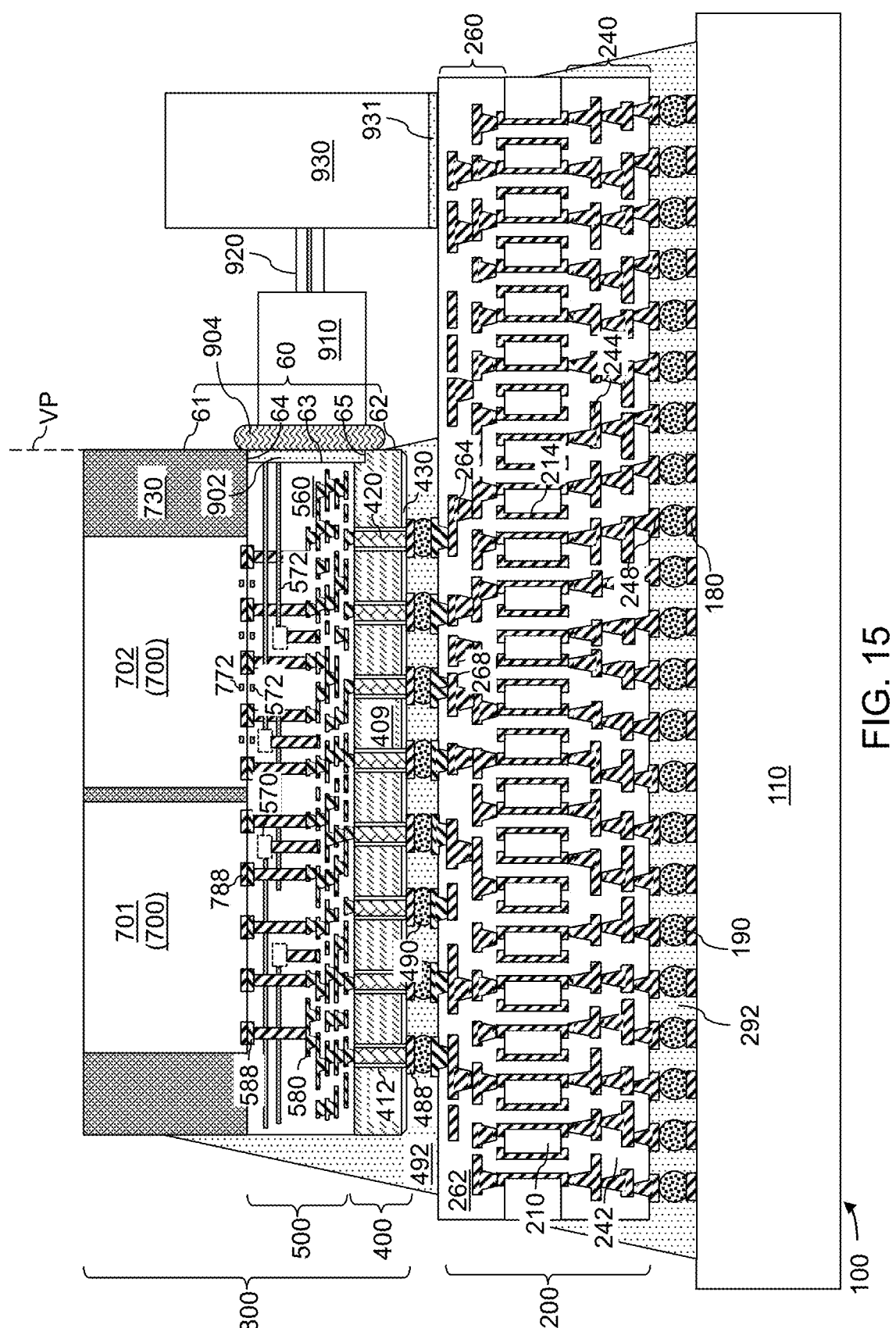
FIG. 15 is vertical cross-sectional view of a third alternative embodiment of the exemplary structure after attaching a fiber access unit to the composite semiconductor package according to an embodiment of the present disclosure.

Referring to FIG. 15, a third alternative configuration of the exemplary structure may be derived from any of the above configurations for the exemplary structure by disposing a module transceiver 930 on a surface of the packaging substrate 200, such as a top surface or a sidewall of the packaging substrate 200. In this embodiment, an adhesive layer 931 may be used to affix the module transceiver 930 to the top surface or to a sidewall of the packaging substrate 200. This arrangement may increase the structural stability of the module transceiver 930, and mitigate against structural damage to the module transceiver 930 during operation of the device of the present disclosure. Further, the packaging substrate 200 may function as a heat sink for the module transceiver 930 during operation of the module transceiver 930.

Referring to FIG. 16, a flowchart illustrates steps for forming a device structure according to an embodiment of the present disclosure.

Referring to step 1610 and FIGS. 1-11, an interposer (400, 500) is provided, which comprises metal wiring structures 580 and optical waveguides 572 that are embedded in interlayer dielectric layers 560 and further comprises a stepped outer sidewall 60 including a laterally-recessed sidewall segment 63 including a vertically-extending surface of the interlayer dielectric layers 560 and laterally recessed relative to a first outermost vertical surface segment 61.

Referring to step 1620 and FIGS. 12-14, a first end of a fiber access unit 910 is optically coupled to a subset of the optical waveguides 572 through at least one optical glue portion (optional 902, 904). The at least one optical glue portion (optional 902, 904) is interposed between the fiber access unit 910 and the laterally-recessed sidewall segment 63 of the stepped outer sidewall 60.

Referring to all drawings and according to various embodiments of the present disclosure, a device structure is provided, which comprises: an interposer (400, 500) comprising metal wiring structures 580 and optical waveguides 572 that are embedded in dielectric layers 560, wherein the interposer (400, 500) comprises a stepped outer sidewall (62, 63, 65) comprising an outermost vertical surface segment (such as a second outermost vertical surface segment 62), a laterally-recessed sidewall segment 63 that is laterally recessed relative to the outermost vertical surface segment (such as the second outermost vertical surface segment 62), and a connecting horizontal surface segment (such as a second connecting horizontal surface segment 65) that connects the outermost vertical surface segment (such as the second outermost vertical surface segment 62) and the laterally-recessed vertical sidewall segment; and a fiber access unit 910 having a first end that is optically coupled to a subset of the optical waveguides 572 through at least one optical glue portion (optional 902, 904) that is interposed between the fiber access unit 910 and the laterally-recessed sidewall segment 63 of the stepped outer sidewall (62, 63, 65).

In one embodiment, the device structure further comprises at least one semiconductor die 700 that is attached to metallic bonding structures of the interposer (400, 500). In one embodiment, the device structure further comprises a molding compound die frame 730 that laterally surrounds the at least one semiconductor die 700, wherein the outermost vertical surface segment (such as a second outermost vertical surface segment 62) is located in a same vertical plane VP as a sidewall of the molding compound die frame 730. In one embodiment, the at least one optical glue portion (optional 902, 904) is in contact with a horizontal bottom surface segment of the molding compound die frame 730 and a bottom portion of the sidewall of the molding compound die frame 730.

In one embodiment, the laterally-recessed sidewall segment 63 vertically extends from a topmost surface of the interlayer dielectric layers 560 at least to a bottommost surface of the interlayer dielectric layers 560. In one embodiment, the interposer (400, 500) comprises a silicon interposer 400 including a silicon substrate 409 and a plurality of through-substrate via structures 420 that vertically extending through the silicon substrate 409; and the laterally-recessed sidewall segment 63 comprise a sidewall surface segment of the silicon interposer 400. In one embodiment, the outermost vertical surface segment (such as a second outermost vertical surface segment 62) comprises a sidewall surface segment of the silicon interposer 400; and the connecting horizontal surface segment (such as the second connecting horizontal surface segment 65) comprises a horizontal surface segment of the silicon interposer 400.

In one embodiment, the at least one optical glue portion (902, 904) comprises: a first optical glue portion 902 contacting the laterally-recessed sidewall segment 63 and having an outer sidewall within a vertical plane VP including the outermost vertical surface segment (such as a second outermost vertical surface segment 62) of the stepped outer sidewall (62, 63, 65); and a second optical glue portion 904 contacting the first end of the fiber access unit 910 and having an inner sidewall that contact the outer sidewall of the first optical glue portion 902.

In one embodiment, the at least one optical glue portion 904 comprises, and/or consists of, a single optical glue portion 904 having a homogeneous material composition and contacting the laterally-recessed sidewall segment 63 and the first end of the fiber access unit 910.

In one embodiment, the interposer (400, 500) comprises an optical transducer that is connected to one of the optical waveguides 572, embedded in the interlayer dielectric layers 560, and is configured to provide conversion between an optical signal in the one of the optical waveguides 572 and an electrical signal that is transmitted to a respective one of the metal wiring structures 580.

In one embodiment, one of the at least one semiconductor die 700 comprises additional optical waveguides 772 that are coupled to a subset of the optical waveguides 572 in the interposer (400, 500) through evanescent coupling to enable transmission of optical signals across an interface between the one of the at least one semiconductor die 700 and the interposer (400, 500).

According to another aspect of the present disclosure, an assembly is provided, which comprises: a composite semiconductor package 800 including an interposer (400, 500)

and at least one semiconductor die 700 that is attached to the interposer (400, 500), wherein the interposer (400, 500) comprises metal wiring structures 580 and optical waveguides 572 that are embedded in dielectric layers 560 and further comprises a stepped outer sidewall 60; a molding compound 730; and a fiber access unit 910 having a first end that is optically coupled to a subset of the optical waveguides 572 through at least one optical glue portion (optional 902, 904) that is interposed between the fiber access unit 910 and the laterally-recessed sidewall segment 63 of the stepped outer sidewall 60, wherein a sidewall of the optical glue portion 902 is aligned with a sidewall of the molding compound 730.

In one embodiment, the stepped outer sidewall 60 comprises: a first connecting horizontal surface segment 64 that connects an edge of the first outermost vertical surface segment 61 to an edge of the laterally-recessed sidewall segment 63; and a second outermost vertical surface segment 62 that is connected to the laterally-recessed sidewall segment 63 through a second connecting horizontal surface segment 65. In one embodiment, the composite semiconductor package 800 comprises a silicon interposer 400 including a silicon substrate 409 and a plurality of through-substrate via structures 420 that vertically extending through the silicon substrate 409; the laterally-recessed sidewall segment 63 comprise a sidewall surface segment of the silicon interposer 400; and the second connecting horizontal surface segment 65 comprises a horizontal surface segment of the silicon interposer 400. In one embodiment, the at least one optical glue portion (optional 902, 904) contacts the laterally-recessed sidewall segment 63 of the stepped outer sidewall 60 and contacts the horizontal surface segment of the silicon interposer 400.

In one embodiment, the at least one optical glue portion (902, 904) comprises: a first optical glue portion 902 contacting the laterally-recessed sidewall segment 63 and having an outer sidewall within a vertical plane VP including the first outermost vertical surface segment 61; and a second optical glue portion 904 contacting the first end of the fiber access unit 910 and having an inner sidewall that contact the outer sidewall of the first optical glue portion 902.

The various embodiments of the present disclosure may be used to provide smooth optical interfaces between the interlayer dielectric layers 560 and at least one optical glue portion (902, 904) that is used to provide optical coupling between an interposer (400, 500) and a fiber access unit 910.

The foregoing outlines features of several embodiments so that those skilled in the art may better understand the aspects of the present disclosure. Each embodiment described employing the term "comprises" also inherently discloses additional embodiments in which the term "comprises" is replaced with "consists essentially of" or with the term "consists of," unless expressly disclosed otherwise herein. Whenever two or more elements are listed as alternatives in a same paragraph of in different paragraphs, a Markush group including a listing of the two or more elements is also impliedly disclosed. Whenever the auxiliary verb "can" is employed in this disclosure to describe formation of an element or performance of a processing step, an embodiment in which such an element or such a processing step is not performed is also expressly contemplated, provided that the resulting apparatus or device can provide an equivalent result. As such, the auxiliary verb "can" as applied to formation of an element or performance of a processing step should also be interpreted as "may" or as "may, or may not" whenever omission of formation of such an element or such a processing step is capable of providing the same result or equivalent results, the equivalent results including somewhat superior results and somewhat inferior results. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An assembly comprising:
a composite semiconductor package including an interposer and a semiconductor die that is attached to the interposer, wherein the interposer comprises metal wiring structures and optical waveguides that are embedded in dielectric layers and further comprises a stepped outer sidewall, wherein the stepped outer sidewall comprises a first outermost vertical surface segment located within a vertical plane, a second outermost vertical surface segment located within the vertical plane, a laterally-recessed sidewall segment that is laterally recessed inward relative to the vertical plane, a first connecting horizontal surface segment that connects an edge of the first outermost vertical surface segment to an edge of the laterally-recessed sidewall segment, and a second connecting horizontal surface segment that connects an edge of the second outermost vertical surface segment to another edge of the laterally-recessed sidewall segment;
a molding compound; and
a fiber access unit having a first end that is optically coupled to a subset of the optical waveguides through an optical glue portion that is interposed between the fiber access unit and a laterally-recessed sidewall segment of the stepped outer sidewall, wherein a sidewall of the optical glue portion is aligned with a sidewall of the molding compound.

2. The assembly of claim 1, wherein:
the composite semiconductor package comprises a silicon interposer including a silicon substrate and a plurality of through-substrate via structures that vertically extend through the silicon substrate;
the laterally-recessed sidewall segment comprise a sidewall surface segment of the silicon interposer; and
the second connecting horizontal surface segment comprises a horizontal surface segment of the silicon interposer.

3. The assembly of claim 2, wherein the optical glue portion contacts the laterally-recessed sidewall segment of the stepped outer sidewall and contacts the horizontal surface segment of the silicon interposer.

4. The assembly of claim 1, wherein the optical glue portion comprises:
a first optical glue portion contacting the laterally-recessed sidewall segment and having an outer sidewall within a vertical plane including the first outermost vertical surface segment; and
a second optical glue portion contacting the first end of the fiber access unit and having an inner sidewall that contacts the outer sidewall of the first optical glue portion.

5. The assembly of claim 1, wherein the optical glue portion comprises a first optical glue portion having an outer sidewall located within the vertical plane.

6. The assembly of claim 5, wherein the outer sidewall of the first optical glue portion is located within the vertical plane.

7. The assembly of claim 5, further comprising a second optical glue portion disposed between the first optical glue portion and the fiber access unit, wherein an interface between the second optical glue portion and the first optical glue portion is located entirely within the vertical plane.

8. The assembly of claim 7, wherein the second optical glue portion has a different material composition than the first optical glue portion, and contacts the first outermost vertical surface segment and the second outermost vertical surface segment.

9. The assembly of claim 1, wherein the molding compound laterally surrounds, and contacts, the semiconductor die.

10. The assembly of claim 9, wherein the first outermost vertical surface segment is a sidewall of the molding compound.

11. The assembly of claim 1, wherein the interposer comprises:

a silicon substrate; and through-substrate via structures vertically extending through the silicon substrate and electrically connected to a respective one of the metal wiring structures.

12. The assembly of claim 11, wherein the second outermost vertical surface segment comprises a sidewall of the silicon substrate.

13. The assembly of claim 11, wherein the interposer comprises interposer-side bonding pads located on an opposite side of the metal wiring structures with respect to the silicon substrate and electrically connected to a respective one of the through-substrate via structures.

14. The assembly of claim 1, wherein:

the interposer comprises metallic bonding structures electrically connected to the metal wiring structures; and the semiconductor die comprises on-die bonding structures that are bonded to the metallic bonding structures by metal-to-metal bonding.

15. The assembly of claim 1, wherein the first connecting horizontal surface segment is located within a horizontal plane including an interface between the interposer and the molding compound.

16. The assembly of claim 1, further comprising a packaging substrate that is bonded to the interposer, wherein the metal wiring structures are more proximal to the packaging substrate than the optical waveguides are to the packaging substrate.

17. An assembly comprising:

a composite semiconductor package including an interposer and a semiconductor die that is attached to the interposer, wherein the interposer comprises metal wiring structures and optical waveguides that are embedded in dielectric layers and further comprises a stepped outer sidewall, wherein the stepped outer sidewall comprises a first outermost vertical surface segment located within a vertical plane, a second outermost vertical surface segment located within the vertical plane, a laterally-recessed sidewall segment that is laterally recessed inward relative to the vertical plane, a first connecting horizontal surface segment that connects an edge of the first outermost vertical surface segment to an edge of the laterally-recessed sidewall segment, and a second connecting horizontal surface segment that connects an edge of the second outermost vertical surface segment to another edge of the laterally-recessed sidewall segment;

a molding compound; and a fiber access unit having a first end that is optically coupled to a subset of the optical waveguides through an optical glue portion that is interposed between the fiber access unit and a laterally-recessed sidewall segment of the stepped outer sidewall, wherein:

a sidewall of the optical glue portion is aligned with a sidewall of the molding compound; and the first connecting horizontal surface segment comprises a horizontal surface segment of the molding compound.

18. The assembly of claim 17, wherein the sidewall of the optical glue portion is located within the vertical plane.

19. An assembly comprising:

a composite semiconductor package including an interposer and a semiconductor die that is attached to the interposer, wherein the interposer comprises metal wiring structures and optical waveguides that are embedded in dielectric layers and further comprises a stepped outer sidewall, wherein the stepped outer sidewall comprises a first outermost vertical surface segment located within a vertical plane, a second outermost vertical surface segment located within the vertical plane, a laterally-recessed sidewall segment that is laterally recessed inward relative to the vertical plane, a first connecting horizontal surface segment that connects an edge of the first outermost vertical surface segment to an edge of the laterally-recessed sidewall segment, and a second connecting horizontal surface segment that connects an edge of the second outermost vertical surface segment to another edge of the laterally-recessed sidewall segment;

a molding compound;

a fiber access unit having a first end that is optically coupled to a subset of the optical waveguides through an optical glue portion that is interposed between the fiber access unit and a laterally-recessed sidewall segment of the stepped outer sidewall, wherein a sidewall of the optical glue portion is aligned with a sidewall of the molding compound; and a packaging substrate bonded to the interposer, wherein the semiconductor die is more distal from the packaging substrate than the interposer is from the packaging substrate.

20. The assembly of claim 19, wherein the interposer comprises:

a silicon substrate;

through-substrate via structures vertically extending through the silicon substrate and electrically connected to a respective one of the metal wiring structures; and interposer-side bonding pads electrically connected to the through-substrate via structures and bonded to substrate bonding pads of the packaging substrate.

* * * * *